US012749954B2

(12) United States Patent
Levin et al.

(10) Patent No.: US 12,749,954 B2
(45) Date of Patent: Sep. 29, 2026

(54) CROWN BRUSHLESS MOTOR DEVICE AND METHOD

(71) Applicant: CONCEPT & DESIGN LTD, Atlit (IL)

(72) Inventors: Shalom Levin, Atlit (IL); Asaf Levin, Atlit (IL)

(73) Assignee: CONCEPT & DESIGN LTD., Atlit (IL)

( * ) Notice: Subject to any disclaimer, the term of this patent is extended or adjusted under 35 U.S.C. 154(b) by 0 days.

(21) Appl. No.: 19/398,078

(22) Filed: Nov. 24, 2025

(65) Prior Publication Data

US 2026/0081508 A1 Mar. 19, 2026

Related U.S. Application Data

(63) Continuation of application No. PCT/IL2024/050512, filed on May 23, 2024.

(60) Provisional application No. 63/503,963, filed on May 24, 2023.

(51) Int. Cl.
*H02K 21/02* (2006.01)

(52) U.S. Cl.
CPC .................................. *H02K 21/021* (2013.01)

(58) Field of Classification Search
CPC .................................................... H02K 21/021
See application file for complete search history.

(56) References Cited

U.S. PATENT DOCUMENTS 7,414,342 B2 * 8/2008 Maeda ................. H02K 21/044 310/263
2002/0149286 A1 10/2002 Horng et al.
2012/0223600 A1 9/2012 Tonogi et al.
2013/0200744 A1 8/2013 Miyamura et al.

FOREIGN PATENT DOCUMENTS

DE 10 2016 219831 4/2017
WO WO9701882 * 1/1997 ........... H02K 19/103

OTHER PUBLICATIONS

Machine Translation of WO97/01882, Feldstein et al., 1997.*

* cited by examiner

*Primary Examiner* — Terrance L Kenerly
(74) *Attorney, Agent, or Firm* — PEARL COHEN LLP

(57) ABSTRACT

A crown brushless motor comprising: a stator; a rotor comprising: a cylindrical core member comprising: a plurality of first extensions extending from a first end of the cylindrical core member, and a plurality of second extensions extending from a second end of the cylindrical core member; and a static wire arranged around the cylindrical core member to magnetize the cylindrical core member to generate a magnetic flux in an axial direction of the cylindrical core member; wherein the plurality of first extensions and the plurality of second extensions are configured to split and guide the magnetic flux and change a direction of the magnetic flux from the axial direction to a direction other than the axial direction upon magnetization of the cylindrical core member by the static coiled wire upon magnetization of the cylindrical core member by the static wire.

16 Claims, 32 Drawing Sheets

PRIOR ART

PRIOR ART

CROWN BRUSHLESS MOTOR DEVICE AND METHOD

CROSS-REFERENCE TO RELATED APPLICATIONS

This application is a continuation of PCT International Application No. PCT/IL2024/050512, International Filing Date May 23, 2024, claiming the benefit of U.S. Provisional Ser. No. 63/503,963 , filed May 24, 2023, which is hereby incorporated by reference.

TECHNICAL FIELD OF THE INVENTION

The present invention relates generally to motor devices, more specifically to brushless motor devices and activation thereof.

BACKGROUND OF THE INVENTION

Brushless motors commonly include several magnets that are attached to the rotor. As the magnets rotate during the operation of the motor, care must be taken to ensure that they are securely attached to the rotor to prevent vibrations or disengagement from the rotor, e.g. to counter centrifugal forces which may be generated during high speed rotation of the rotor. Adhesives such as glue, dovetail fitting, or outer rings are often used to secure magnets onto the rotor.

However, in the lifespan of a motor, magnets attached to rotors are subject to centrifugal forces as the rotor rotates. Further, permanent magnets for brushless motors are expensive motor components.

Thus, there is a need for a solution that allows for a motor design which avoids the attachment of permanent magnets to a rotor, or avoids the use of permanent magnets in brushless motor arrangements.

SUMMARY OF THE INVENTION

Improvements and advantages of embodiments of the invention may include avoiding the use of expensive permanents or avoiding the need for any additional magnet support.

Embodiments of the invention may improve the technology of brushless motors, by increasing the accuracy in the handling of brushless motors, since magnetic fields and magnetic flux may be adjustable based on the shape of the rotor, e.g. via the use of extensions that may extend radially or axially from a rotor core and, upon magnetization of the rotor core, may separate the magnetization of a rotor core from a single North/South polarization to a plurality of North Pole and South Pole magnetizations.

Improvements and advantages of embodiments of the invention may also include increasing the torque of brushless motors, since by locating electromagnets on a stator which axially surrounds the rotor, the stator may have a larger radial diameter compared to stators known in the art and may provide more surface area for the presence of magnets than the rotor, thus, may allow a greater precision in the interaction of magnetic fields between the stator and rotor.

One embodiment may include a crown brushless motor including: a stator; a rotor including: a cylindrical core member including: a plurality of first extensions extending from a first end of the cylindrical core member, and a plurality of second extensions extending from a second end of the cylindrical core member; and a wire, e.g. a coil or a coiled wire, arranged around the cylindrical core member.

In some embodiments, the plurality of first extensions and the plurality of second extensions are configured to guide magnetic flux upon magnetization of the cylindrical core member.

In some embodiments, the plurality of first extensions includes a number of extensions selected from a group consisting of: 2, 4, 6, 8, 12, 32, 36, and 100.

In some embodiments, the plurality of second extensions includes a number of extensions selected from a group consisting of: 2, 4, 6, 8, 12, 32, 36, and 100.

In some embodiments, the plurality of first extensions and the plurality of second extensions are u-shaped extensions.

In some embodiments, the wire is static relative to the cylindrical core member and configured to magnetically energize the cylindrical core member via induction.

In some embodiments, the cylindrical core member, the first extensions and the second extensions are axially magnetizable.

In some embodiments, the axially magnetizable cylindrical core member, the first extensions and the second extensions form a single permanent magnet.

In some embodiments, an axial magnetization of the cylindrical core is split between the first extensions and the second extensions.

In some embodiments, the cylindrical core member is freely rotatable within the coiled wire, e.g. a static coil, arranged around the cylindrical core member.

In some embodiments, the cylindrical core member is selected from an iron-laminated stack, a permanent magnetic material, a soft magnetic composite (SMC), or a combination thereof.

In some embodiments, the cylindrical core member, the first extensions and the second extensions are selected from an iron-laminated stack, a permanent magnetic material, SMC, or a combination thereof.

In some embodiments, the first extensions extending are evenly arranged along a circumference of the first end of the cylindrical core member.

In some embodiments, the second extensions extending are evenly arranged along a circumference of the second end of the cylindrical core member.

In some embodiments, the motor includes openings in rotor flanges between the rotor and the stator which are configured to ventilate the rotor and stator.

In some embodiments, the wire arrangement is mounted on the stator.

In some embodiments, the plurality of first extensions and the plurality of second extensions extend towards a center level of the cylindrical core.

In some embodiments, the plurality of first extensions extending and the plurality of second extensions extend outwardly towards a center level of the cylindrical core.

In some embodiments, the plurality of first extensions extending and the plurality of second extensions extend inwardly towards a center level of the cylindrical core.

In some embodiments, the plurality of first extensions includes a first member coupled to a first end of the cylindrical core member, the first member including a circular first base and the plurality of first extensions extending from the first circular base.

In some embodiments, the plurality of second extensions includes a second member coupled to a second end of the cylindrical core member, the second member including a circular second base and the plurality of second extensions extending from the second circular base.

In some embodiments, the first extensions and the second extensions are configured to induce a flow of magnetic flux from the first extensions to the second extensions.

In some embodiments, the magnetic flux is located outside of the cylindrical core member.

In some embodiments, the magnetic flux is located inside of the cylindrical core member.

In some embodiments, the plurality of first extensions and the plurality of second extensions are interlaced.

In some embodiments, each extension of the first extensions and each extension of the second extensions is separated by a groove which separates each extension into an extension pair.

In some embodiments, the groove is configured to redirect magnetic flux from the rotor to the stator.

In some embodiments, an output of mechanical energy by the crown brushless motor is controlled by one or more of: shape of the first extensions and the second extensions, magnetic flux direction between the first extensions and the second extensions, stator polarity, electric energy applied to each of the stator electromagnets, distance between the first extensions and electromagnets of the stator, and distance between the second extensions and electromagnets of the stator.

In some embodiments, the stator includes a plurality of electromagnets.

In some embodiments, the electromagnets are arranged radially around the rotational axis of the rotor.

In some embodiments, the plurality of electromagnets is attached to the stator.

In some embodiments, each of the electromagnets of the stator surrounds a section of an extension of the first extensions and a section of an extension of the second extensions.

In some embodiments, each of the plurality of electromagnets is polarizable to generate a repulsion force between a magnetic field of the one or more electromagnets and a magnetic field of the rotor.

In some embodiments, each of the plurality of electromagnets is polarizable to generate an attraction force between a magnetic field of the one or more electromagnets and a magnetic field of the rotor.

In some embodiments, the stator is configured to adjust torque and/or rotational speed of the cylindrical core member by activating one or more electromagnets of the plurality of electromagnets.

In some embodiments, each of the electromagnets is configured to periodically switch its polarity and may be configured to interact with a magnetic field of the rotor to rotate the cylindrical core member around the cylindrical core member's axial axis.

One embodiment may include a method of activating a crown brushless motor, wherein the crown brushless motor includes: a stator including: a plurality of electromagnets, wherein the plurality of electromagnets is radially arranged the rotor axis; a rotor including: a cylindrical core member including: a plurality of first extensions extending from a first end of the cylindrical core member, and a plurality of second extensions extending from a second end of the cylindrical core member, wherein each of the plurality of first extensions and each of the plurality of second extensions are separated by a groove which separates each extension into extension pairs; and a wire arranged around the cylindrical core member, including the steps of: a) magnetically activating the wire to polarize the first and the second extension pairs of the rotor; and b) magnetically activating one or more electromagnets of the stator to create a magnetization that leads to a repulsion force between the one or more electromagnets and a first section of the extension pair, thereby rotating the rotor.

In some embodiments, the method includes a step of: magnetically activating one or more electromagnets of the stator to create a magnetization that leads to an attraction force between the one or more electromagnets and a second section of the extension pair.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
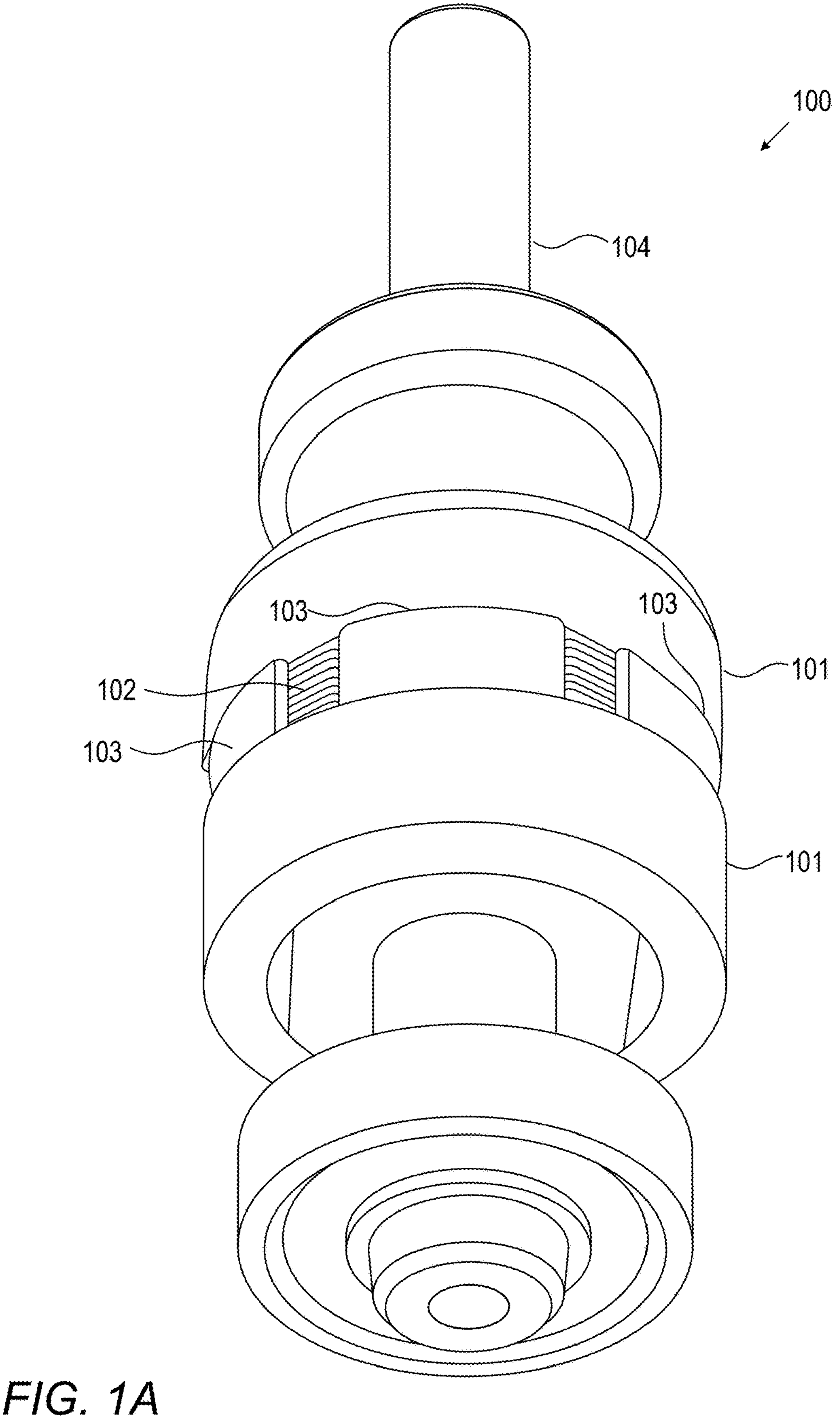
FIG. 1A shows conventional brushless motor rotor as known in the art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

As used herein, "magnetic pole" may refer, for example, to a region or an area at each end of a magnet, e.g. a magnetized rotor, magnetized cylindrical core member or an electromagnet located at a stator, where the external magnetic field is strongest. There are two types of magnet poles "North Pole" and "South Pole". Interaction between these poles may govern the behavior of magnets, e.g. attraction and repulsion.

As used herein, "North Pole" may refer, for example, to an area of a magnet where magnetic field lines exit the magnet and extend outward into surrounding space. It may be attracted to the South Pole of another magnet and may repel other North Poles.

As used herein, "South Pole" may refer, for example, to an area of a magnet where magnetic field lines enter the magnet, converging towards it. It may be attracted to the North pole of another magnet and may repel other South Poles.

As used herein "brushless motor" may refer, for example, to an electric motor which operates without brushes, e.g. using electronic commutation instead.

FIG. 1A shows conventional brushless motor rotor 100 as known in the art. Brushless motor rotor 100 may include a rotor core 102, four permanent magnets 103 (only three magnet referenced in FIG. 1A) which form a radial array around the rotor shaft 104, and two metallic cups 101, which secure magnets 103 against centrifugal forces that may arise during rotation of the rotor core 102. Commonly, in an arrangement with four permanent magnets 103, rotor 100 may have four poles, two negatively charged areas (also referred to herein as North Poles) and two positively charged area (also referred to herein as South Poles).

Figure 1B:
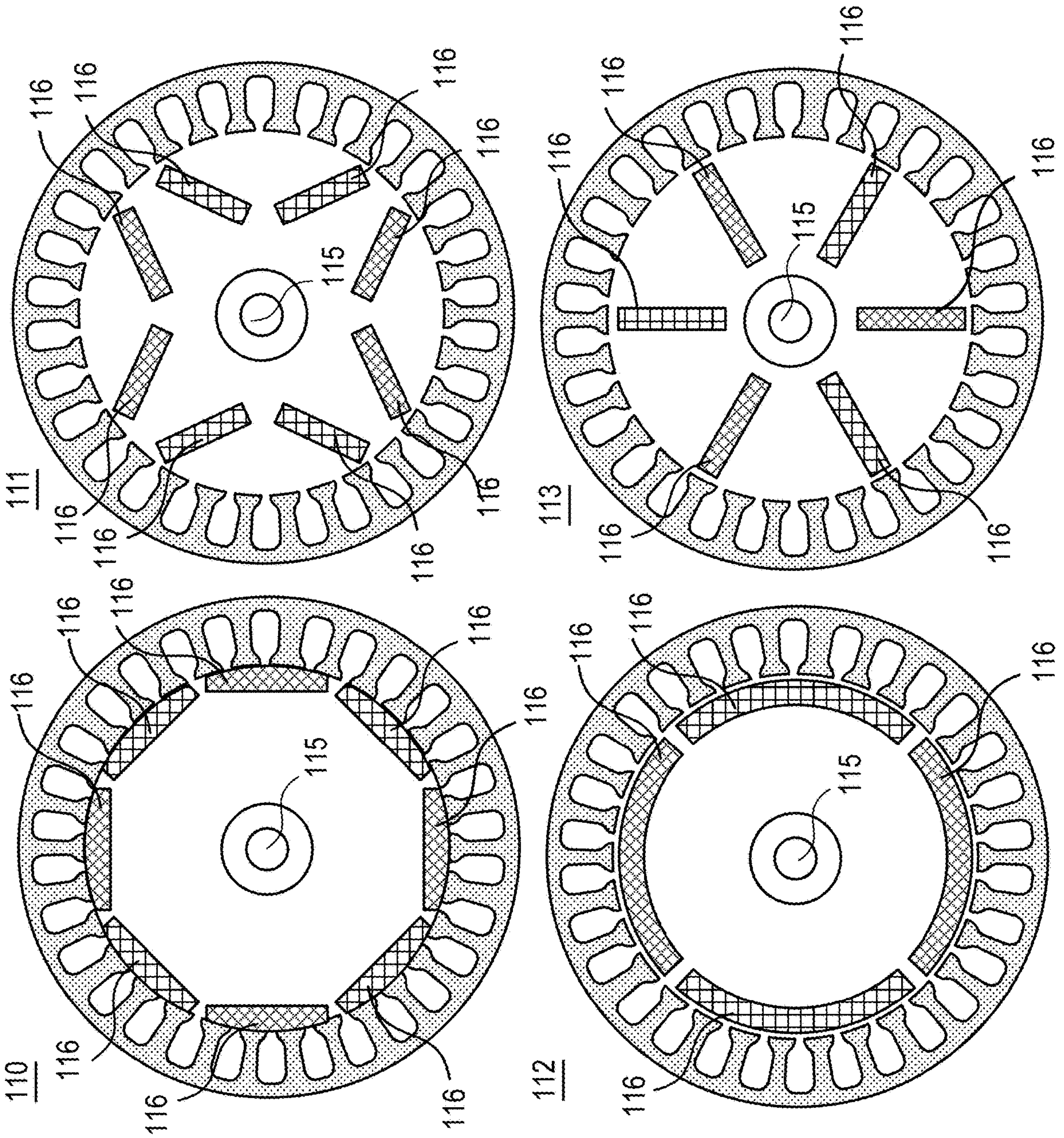
FIG. 1B shows brushless rotors with four prior art magnets arrangements attached to the rotor shaft.

FIG. 1B shows brushless rotors with four prior art magnets arrangements 110, 111, 112 and 113 attached to rotor shaft 115. In all four arrangements, a plurality of magnets 116, e.g. four, six or eight magnets, are attached to rotor shaft 115 and may be exposed to high forces, e.g. centrifugal forces, that arise during the rotation of rotor 115. Such an exposure to rotational forces may result in loosening of the magnets 116 and can lead to the detachment of magnets 116 and the risk of severe damage to motor components.

The present invention may relate to a brushless motor in which the magnetic flux of the motor is managed by a single magnet, e.g. a permanent magnet or an magnetizable electromagnet, that forms part of the cylindrical core member of a rotor and may interact with one or more magnets, e.g. electromagnets, that form part or are mounted onto a stator. In an embodiment, a crown brushless motor includes a stator and a rotor.

A rotor may include a cylindrical core member. A rotor may be a magnet or made from a magnetizable material. For example, a cylindrical core of a rotor can be an electromagnet and may be activated by a coiled wire (e.g., coil) arranged around the cylindrical core member of a rotor, e.g. a static activating coil. A static activating coil and a laminated cylindrical core may be concentric to each other and to a stator. A cylindrical core can be a permanent magnet of any kind and shape or made from a Soft magnetic composite (SMC), whether it made from a single element or a composition of a plurality of elements. When a cylindrical core member is a magnet such as a permanent magnet, no coiled wire (e.g. a coil) may be arranged around the cylindrical core member since the magnet is already activated.

A cylindrical core member may include a plurality of first extensions which extend from a first end of a cylindrical core member. A cylindrical core member may include a plurality of second extensions which extend from a second end of a cylindrical core member. A plurality of first extensions and a plurality of second extensions may be crown-shaped, e.g. they may be serrated and may divide magnetic flux of a cylindrical core member, e.g. a single source magnet, into a plurality of magnetic extensions. A plurality of first extensions and a plurality of second extensions may include axial extensions and, for example, the serrations of the axial extensions may have the same diameter as the diameter of the cylindrical core member and extend outwardly or inwardly from the cylindrical core member.

For example, a cylindrical core member, a plurality of first extensions and a plurality of second extensions may have a shape of a rod with crown-like ends and can be magnetized in axial direction of the rod. A cylindrical core member may be a solid permanent magnet or made from a soft magnetic composite (SMC) and may be positioned (e.g., sandwiched) between a plurality of first extensions and a plurality of second extensions which may be made of, for example, a soft iron lamination, a soft magnetic composite (SMC) or a permanent magnetic material. In one example, a cylindrical core member and a plurality of first extensions and a plurality of second extensions of a rotor may be made of a soft iron laminated stack or SMC which can be magnetically energized by a coiled wire, e.g. a static coil.

For example, a plurality of first extensions and/or a plurality of second extensions may extend radially from the cylindrical core member. A plurality of first extensions and/or a plurality of second extensions may be u-shaped extensions, and extend outwardly from the cylindrical core member and the extension ends of a plurality of first extensions may face the extension ends of a plurality of second extensions. A plurality of first extensions and/or a plurality of second extensions may be u-shaped extensions and extend inwardly of the cylindrical core member and the extension ends of a plurality of first extensions may face the extension ends of a plurality of second extensions. U-shaped extensions may guide or direct magnetic flux between a plurality of first extensions and a plurality of second extensions, e.g. a magnetic field between a plurality of first extensions in form of a negatively charged pole to a plurality of second extensions in form of a positively charged pole. Depending on an inward or outward orientation of the u-shaped extensions, magnetic flux may be guided inwardly within the cylindrical core member or outwardly outside of the cylindrical core member.

In one example, a number of first extension and a number of second extensions may not be limited. In some instances, a number of first extension and a number of second extensions may be between 1 and 100, e.g. 4, 6, 8, 32 or 36 extensions.

A plurality of first extensions and/or a plurality of second extensions may include crown-like elements which can have a primary splitting of serrations in the shape of a crown-ring with several serrations which are rigidly connected to each other. Since the plurality of first extensions and/or a plurality of second extensions may be mounted or form part of a cylindrical core member, they may not require support against centrifugal forces, e.g. unlike magnets which are attached to a rotor as shown in FIGS. 1A and 1B. The crown-like elements may be shaped for optimal meshing with the stators electromagnets cores. For example, shapes and dimensions of edges of each extension may be adapted to shapes that differ from shapes commonly used in brushless motors that use permanent magnets.

A rotor may include a coiled wire which is arranged around a cylindrical core member. A coiled wire may be static relative to the cylindrical core member and configured to magnetically energize the cylindrical core member via induction. For example, a coiled wire may be a coaxial static coil which is rigidly connected to a stator or any part of a motor frame of a brushless motor. An inside diameter of the static coil may be slightly larger than the cylindrical core member to enable the cylindrical core member of the rotor to freely rotate and to become magnetically energized during the rotor rotation.

For example, a cylindrical core member may be rod-shaped and the plurality of first extensions which extend from a first end of a cylindrical core member and the plurality of second extensions which extend from a second end of a cylindrical core member may be crown-shaped and may be magnetizable by a wire, e.g. a coaxial static coil that surrounds the cylindrical core member. The shape of the extensions may be customizable and may be formed into any three-dimensional shape which may be suitable for its use in a brushless motor. A cylindrical core member may be surrounded by a stator. A stator may include a plurality of magnets, e.g. electromagnets. Each of the electromagnets which surrounds a stator may be polarizable, e.g. can form a magnetic North Pole and a magnetic South Pole.

The relationship between rotor and stator may be controlled by: crown-like extensions shape, the magnetic flux path between the extensions, by controlling the stator electromagnets polarity, applied certain power to each of the stator electromagnets, and controlling the distance, e.g. an air gap size between the plurality of first and second extensions and electromagnets cores of the electromagnets located at the stator.

Figure 2A:
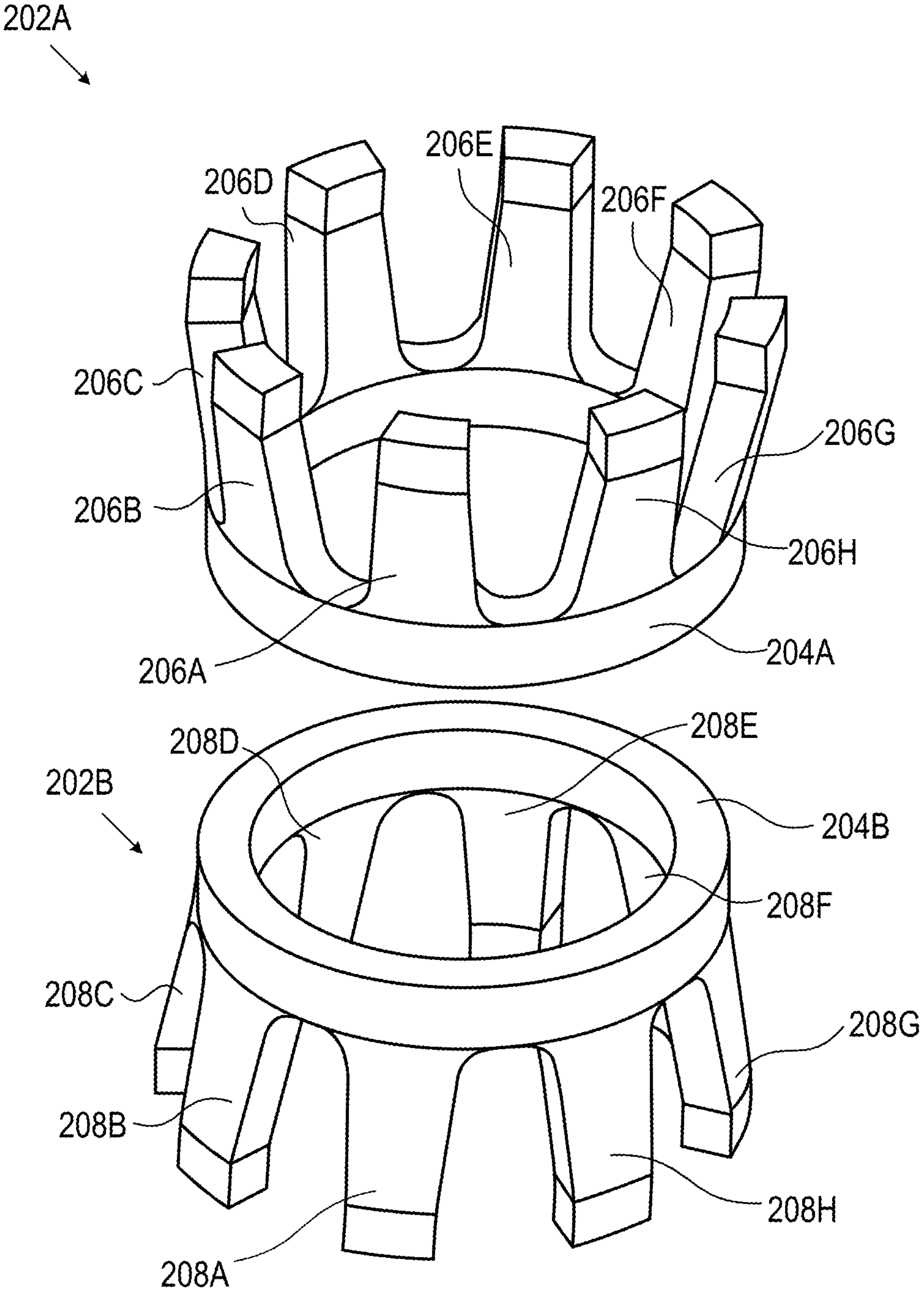
FIG. 2A shows an example of a plurality of first and second rotor extensions for a brushless motor, according to some embodiments of the present invention.

FIG. 2A shows an example of a plurality of first extensions 202A and a plurality of second extensions 202B for a crown brushless motor, according to some embodiments of the present invention. Each plurality of extensions may have a center ring 204A or 204B and eight extensions 206A-206H or 208A-208H. For example, center ring 204A and eight extensions 206A-206E may be made of a rigid structure, e.g. a structure which tolerates centrifugal forces during the rotation of the rotor at high speeds. Extension 202A and 202B may have eight extensions, but the number of extensions is not limited to eight and can vary from a single extension to a plurality of extensions.

Figure 2B:
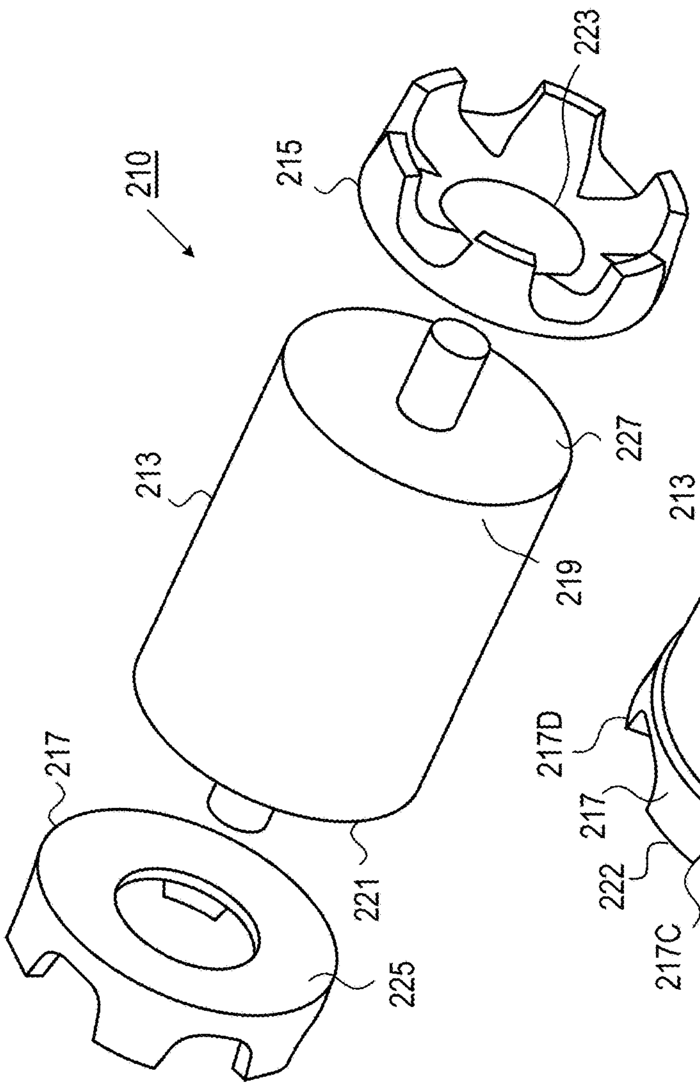
FIG. 2B shows an exploded view of three components of a rotor of a crown brushless motor: a cylindrical core member, a plurality of first, axial extensions and a plurality of second, axial extensions, according to some embodiments of the present invention.

FIG. 2B shows an exploded view of three components of rotor 210 of a brushless motor: cylindrical core member 213, a plurality of first extensions 215 and a plurality of second extensions 217, according to some embodiments of the present invention. Crown-shaped extensions 215 and 217 may be axial extensions of cylindrical core member 213. Cylindrical core member 213 may be a solid permanent magnet or made from a soft magnetic composite (SMC). In this case, no coil, wire, or coiled wire may be needed to magnetize the cylindrical core member. Cylindrical core member 213 may include an electromagnet (e.g. activated by a coiled wire, e.g. wire 314 shown in FIG. 3, arranged around the cylindrical core member shown in FIG. 3) which can function as a solid magnet with one axial negative polarization, e.g. North Pole 219, and one axial positive polarization, e.g. South Pole 221. Crown-shaped extensions 215 and 217 may be made of soft iron. Crown-shaped extensions 215 and 217 may include a central ring 223 and 225 respectively and a plurality of extensions around it, e.g. six extensions. Extensions 215 or 217 may be part of central ring 223 or 225 and can withstand centrifugal forces when the rotor rotates at high speed.

Figure 2C:
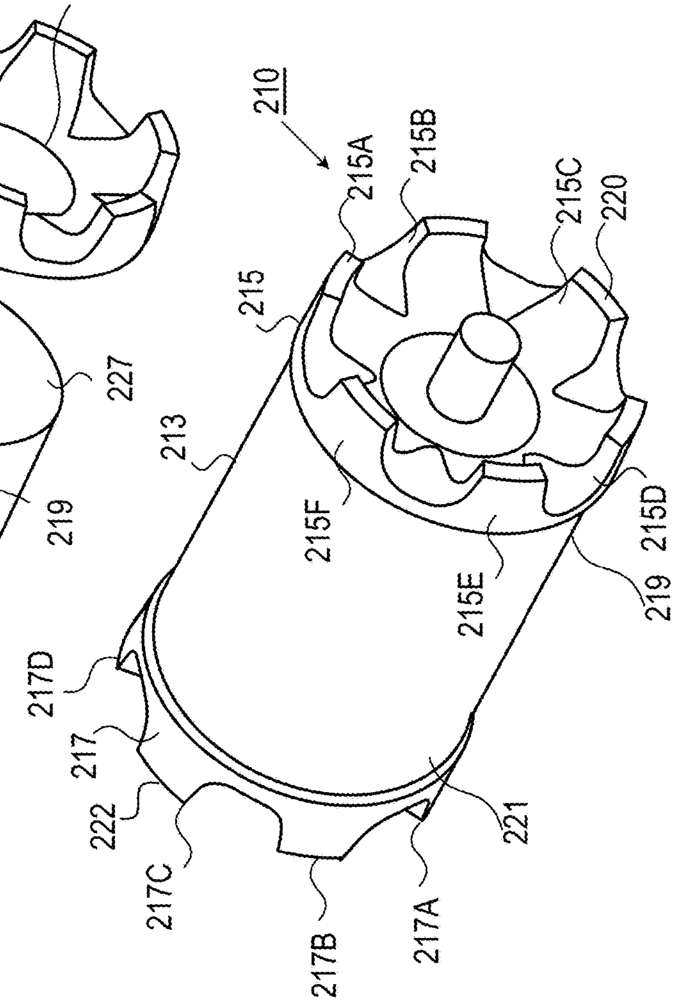
FIG. 2C is an example assembly of a rotor, according to some embodiments of the present invention.

FIG. 2C is an example assembly of a rotor 210, according to some embodiments of the present invention. Rotor 210 may include an assembly of a cylindrical core member 213 and crown-shaped extensions 215 and 217. When a plurality of first extensions, e.g. crown-shaped extension 215C, is attached to North Pole 219 of a magnetically polarized cylindrical core member 213, e.g. a permanent magnet, a magnetic flux may flow through crown ring 223 of crown-shaped extension 215 and may split into extensions 215A-215F. In the case of six extensions 215A-215F, six axial, negatively polarized North Poles 220 may be generated. In the polarized state, e.g. during operation of the motor, a magnetic flux may flow in axial direction of the cylindrical core member, e.g. in plane of magnet core cross-section 227. Magnetic flux may arrive at crown ring 223 of crown-shaped extension 215 and may be separated upon entering ring 223 and may be divided into extensions 215A-215F. During operation of a motor, in the case of six extensions 217A-217F (only four Poles 217A-217D shown in FIG. 2C), six axial, positively polarized South Poles 222 may be generated.

With respect to the polarization at crown-shaped extensions 215, the sum of the six areas represented by North Poles 220 located at the tip of extensions 215A-215F, may be smaller than the surface of the diameter of cylindrical core member 227. Since the flux density is in inverse relationship relative to the area it is subjected to, the magnetic flux density emitted from the sum of six areas represented by North Poles 220 may be significantly higher than the average magnetic flux density that is located/emitted from the cross-section 227 represented by the diameter of cylindrical core member 213. An innovative step according to some embodiments of the present invention may be that the shapes of a plurality of first extensions 215 and a plurality of second extensions 217 may be adaptable/customizable to the application of the motor. For example, the magnetic flux arising during operation of a motor can be modulated/altered based on the shape of extensions 215 and 217 to achieve a brushless motor design which results, e.g. in a high performance of a motor.

Figure 2D:
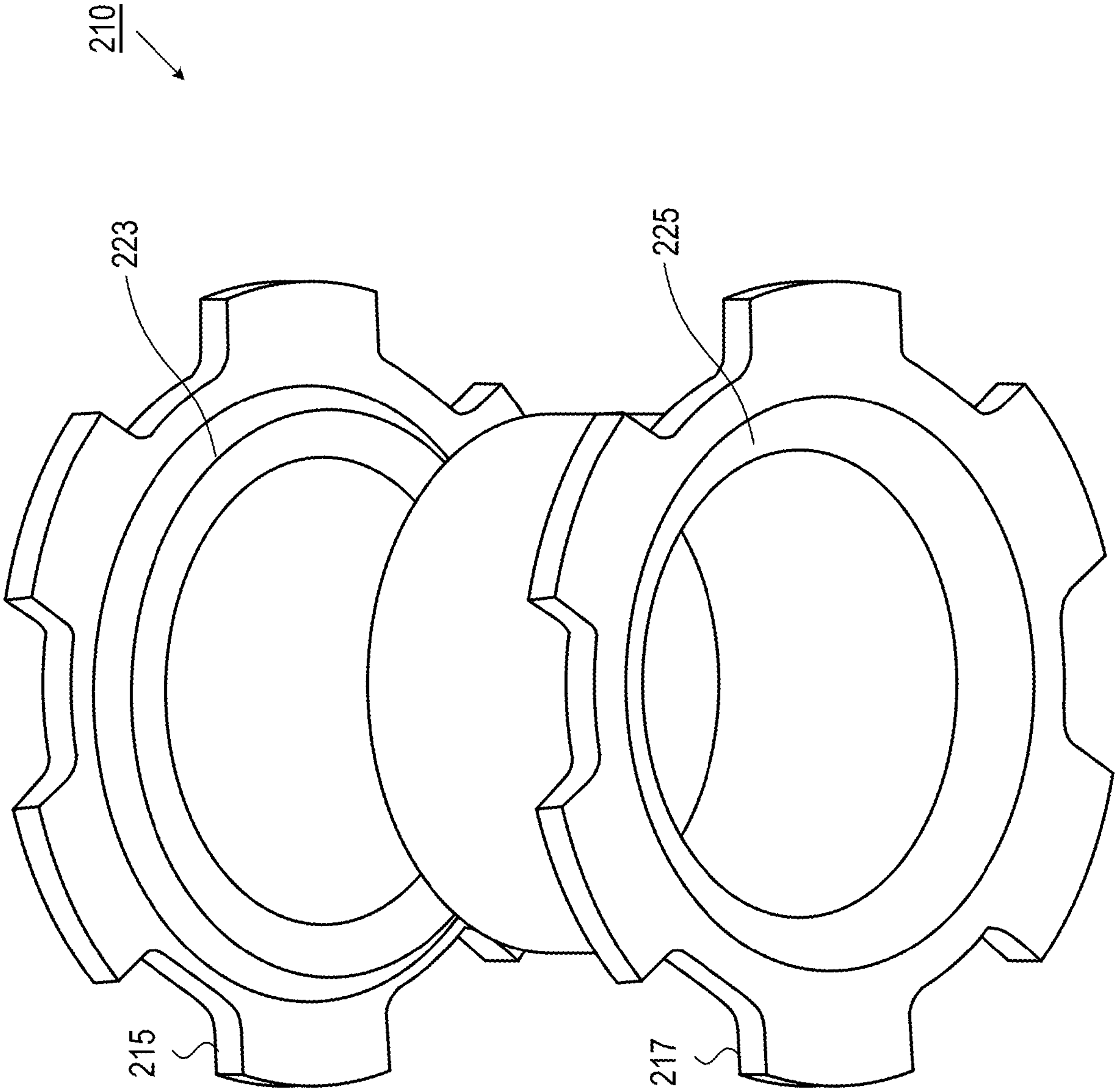
FIG. 2D shows an example rotor in form of an axially magnetized, tubular rotor including six first, radial extensions and six second, radial extensions, according to some embodiments of the present invention.

FIG. 2D shows an example rotor 210 in form of an axially magnetized, tubular rotor including six first extensions 215 and six second extensions 217, according to some embodiments of the present invention. Six first extensions 215 and six second extensions 217 may be attached to rings 223 and 225, respectively.

Figure 2E:
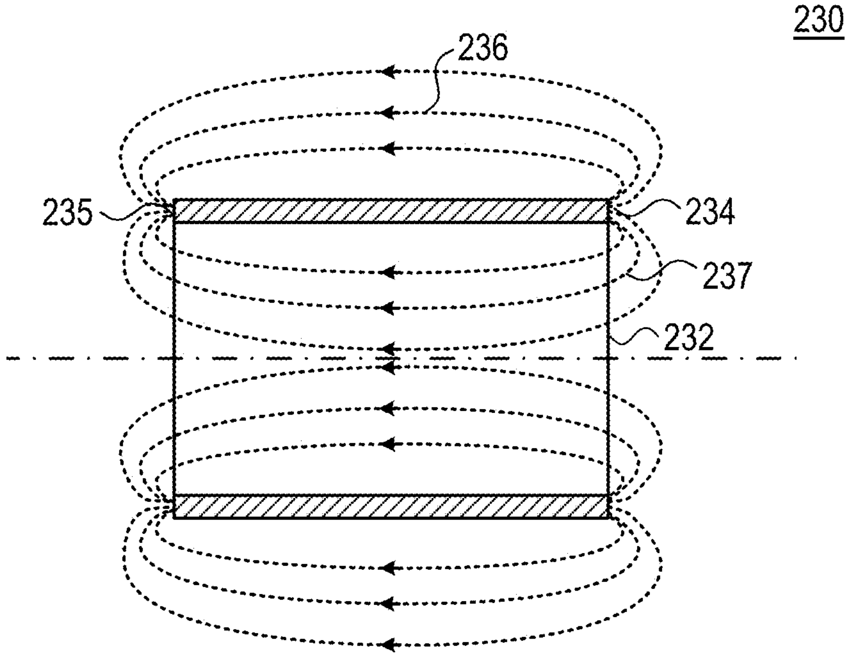
FIG. 2E shows a magnetic field exhibited by a tubular permanent magnet as known in the art.
Figure 2E:
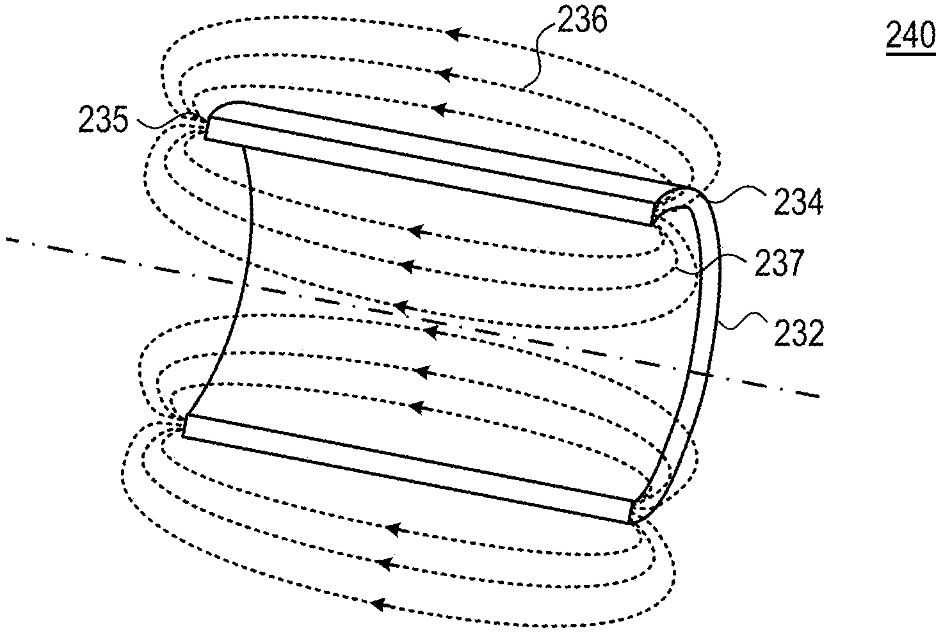

FIG. 2E depicts two views 230 and 240 of a magnetic field exhibited by a tubular permanent magnet 232 as known in the art. Magnetic flux may flow from North Pole 234 to the South Pole 235, via external paths 236 and internal paths 237.

Figure 2F:
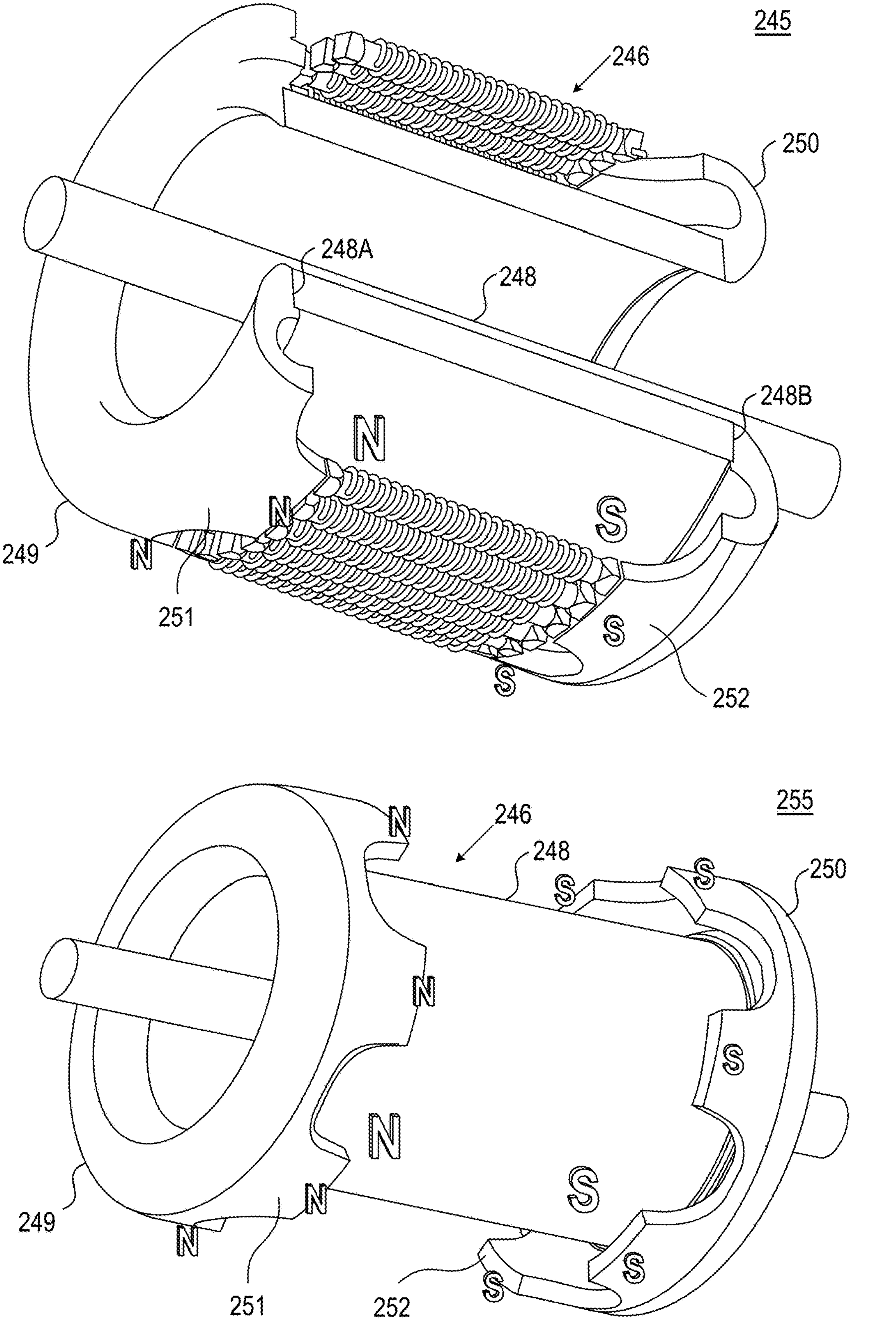
FIG. 2F shows an axially magnetized tubular rotor including a cylindrical core with a first extension and a second extension, according to some embodiments of the present invention.

FIG. 2F depicts two views 245 and 255 of an axially magnetized tubular rotor 246 including a cylindrical core member 248 with a first extension 249 and a second extension 250, according to some embodiments of the present invention. Axially magnetized tubular rotor 246 may include a plurality of first and second extensions 249 and 250 in form of u-shaped, crown-like extensions which extend outwardly from the first end of cylindrical core member 248A and the second end of the cylindrical core member 248B. Since the plurality of first and second extensions 249 and 250 extend outwardly, the outward facing plurality of first extensions 2008 may direct magnetic flux externally outside of cylindrical core member 248 from North Pole 251 to South Pole 252 located at the plurality of second extensions 250. Since magnetic lines of a magnetic field are preferably located within a ferromagnetic material rather than within air, orientation of u-shaped plurality of first extensions 249 and plurality of second extensions 250 may allow creating a magnetic flux that is located inside or outside a cylindrical core member 248. Thus, separating magnetic flux from a main magnetic source, e.g. cylindrical core member 248 into plurality of first extensions 249 and second extensions 250 may allow designing routings for magnetic lines and controlling magnetic flux density at each cross-section along the path of magnetic flux within a magnetic field.

Figure 2G:
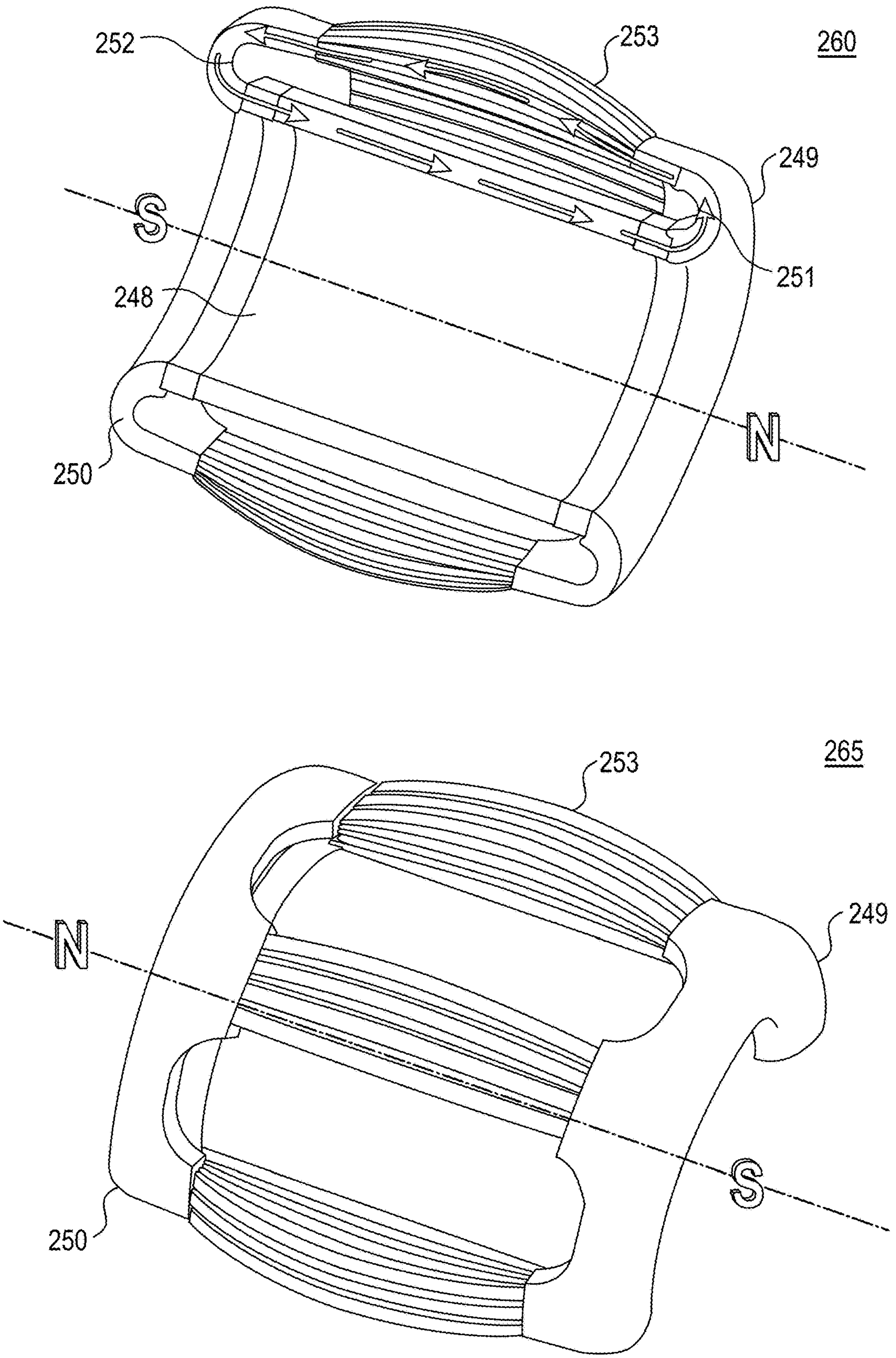
FIG. 2G shows a cylindrical core member including a first and second extension wherein the first and second extensions extend outwardly from and end of the cylindrical core member, according to some embodiments of the present invention.

FIG. 2G shows two views 260 and 265 a cylindrical core member 248 including a first and second extension 249 and 250, wherein the first and second extensions have u-shaped extensions which extend outwardly from and end of the cylindrical core member 248, according to some embodiments of the present invention. Magnetic flux 253 may be located outside of cylindrical core member 248 from North Pole 251 to South Pole 252 and may move inside cylindrical core member 248 from South Pole 252 to North Pole 251.

Figure 2H:
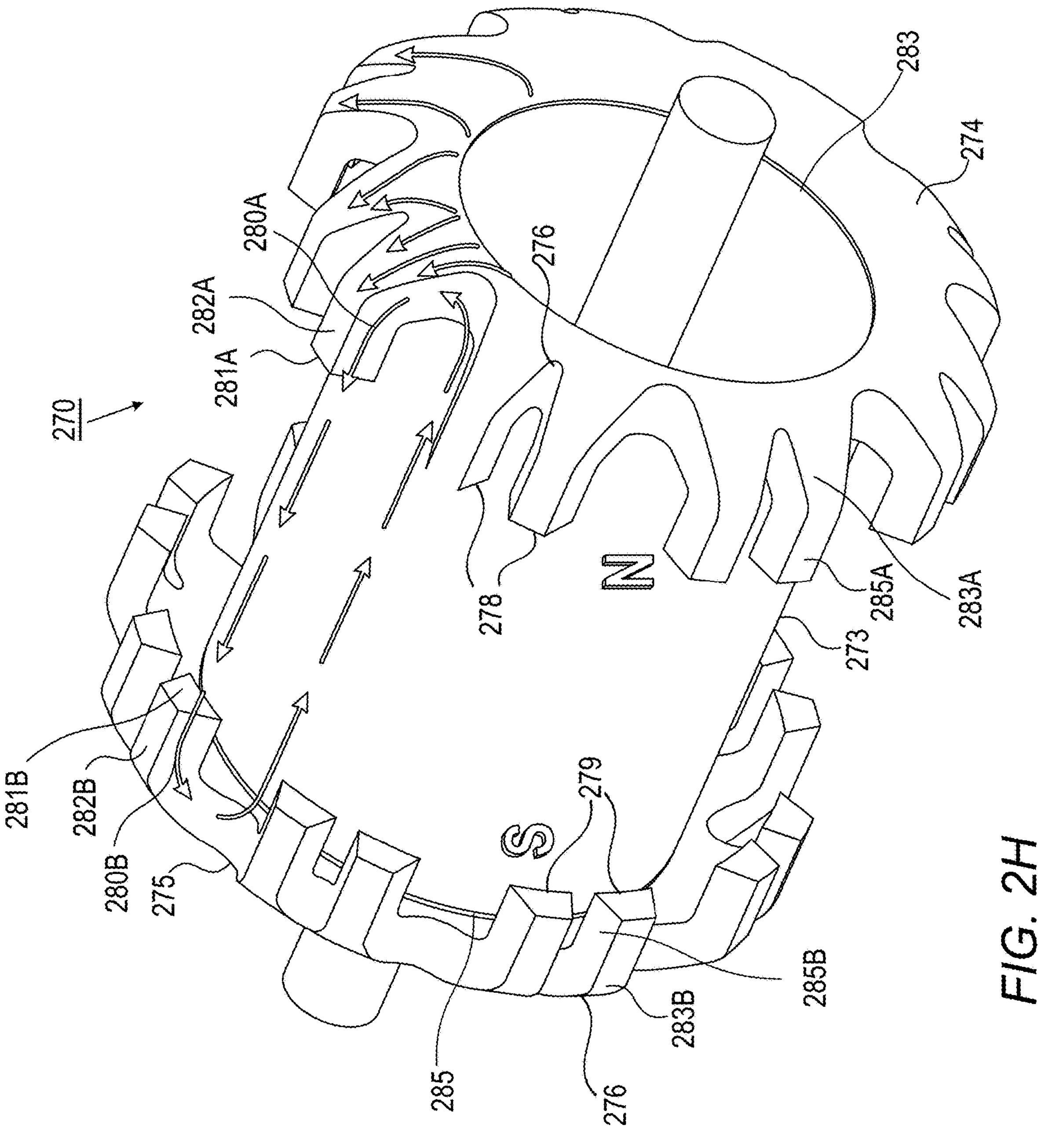
FIG. 2H shows an axially magnetized, tubular rotor including a cylindrical core member and a plurality of first extensions and a plurality of second extensions, according to some embodiments of the present invention.

FIG. 2H shows an axially magnetized, tubular rotor 270 including a cylindrical core member 273 and a plurality of first extensions 274 and a plurality of second extensions 275, according to some embodiments of the present invention. Cylindrical core member 273 may be a solid permanent magnet or made from a soft magnetic composite (SMC) and may be positioned (e.g., sandwiched) between a plurality of first extensions 274 and a plurality of second extensions 275 which may be made of, for example, soft iron, such as a soft iron lamination, a soft magnetic composite (SMC) or a permanent magnetic material. Each extension of a plurality of first extensions 274 may be separated by a groove, e.g. groove 276, which separates each extension into an extension pair 278. Each extension of a plurality of second extensions 275 may be separated by a groove 276 which separates each extension into an extension pair 279. Accordingly, a plurality of first extensions 274 and a plurality of extension of second extensions 275 may have eight extensions 274A-274H and 275A-275H (not individually labelled in FIG. 2H) which may be separated by a groove 276 into eight extension pairs leading to 16 North Poles for a plurality of first extensions and 16 South Poles for a plurality of second extensions. Extensions of the plurality of first extensions 274 and the plurality of second extensions 275 may be attached to crown rings 283 and 285, respectively, and may be curved in segments, e.g. as represented by segments 283A and 285A for segments located at the North Pole and as represented by segments 283B and 285B for segments located at the South Pole, towards a center level of the cylindrical core. As shown in FIG. 2H, a plurality of first extensions 274 and a plurality of second extensions 275 may extend outwardly towards a center level of the cylindrical core member 273. Magnetic flux located at surfaces 281A and 282A of the North Pole may be directed to surfaces 281B and 282B of the South Pole, e.g. without any form of magnetic interference to other spatial directions. Arrows 280A and 280B may represent how the magnetic flux is guided via extensions located at the North Pole and at the South Pole. Specifically, magnetic flux may be guided outwardly from surfaces 281A and 282A located at the North Pole to surfaces 281B and 282B located at the South Pole. Surfaces 281A/B and 282A/B may be surfaces which are configured to be in close proximity of electromagnetic cores of electromagnets of a stator. For example, an electromagnet core of a stator may be located between surfaces 281A and 281B. Since extensions may be configurable in their shape, their shape may be tailored, e.g. to a suitable or preferred arrangement of electromagnets located at a stator. In this way, dimensions of extensions 274 and 275 may be adaptable to possible restrictions in the configuration of stator electromagnets or may enable an efficient counterplay between stator and rotor. For example, the outside diameter of a rotor can be accurately machined, e.g. by adapting the shapes of a plurality of first extensions 274 and a plurality of second extensions 275 to the spatial requirements of a stator. As a result, a distance between rotor and stator may be smaller than 50 microns.

Since the magnetic flux density is inversely related to the cross-sectional area of an object, and the cross-sectional area for each extension is significantly smaller than the cross-section area of a cylindrical core member, the flux density at the extension tips 282A or 282B may be higher than the flux density which is observed at the cross-section of cylindrical core member, e.g. surface 227 as shown in FIG. 2B.

Openings in the rotor flanges and the space between the rotor and the stator may be configured to ventilate the rotor and stator and allow air to penetrate the motor arrangement. Penetration of air within the motor arrangement may further allow cooling of the rotor and the stator and prevent the crown brushless motor from overheating. The openings may reduce the weight of the rotor weight and the inertia of the rotor.

Figure 2I:
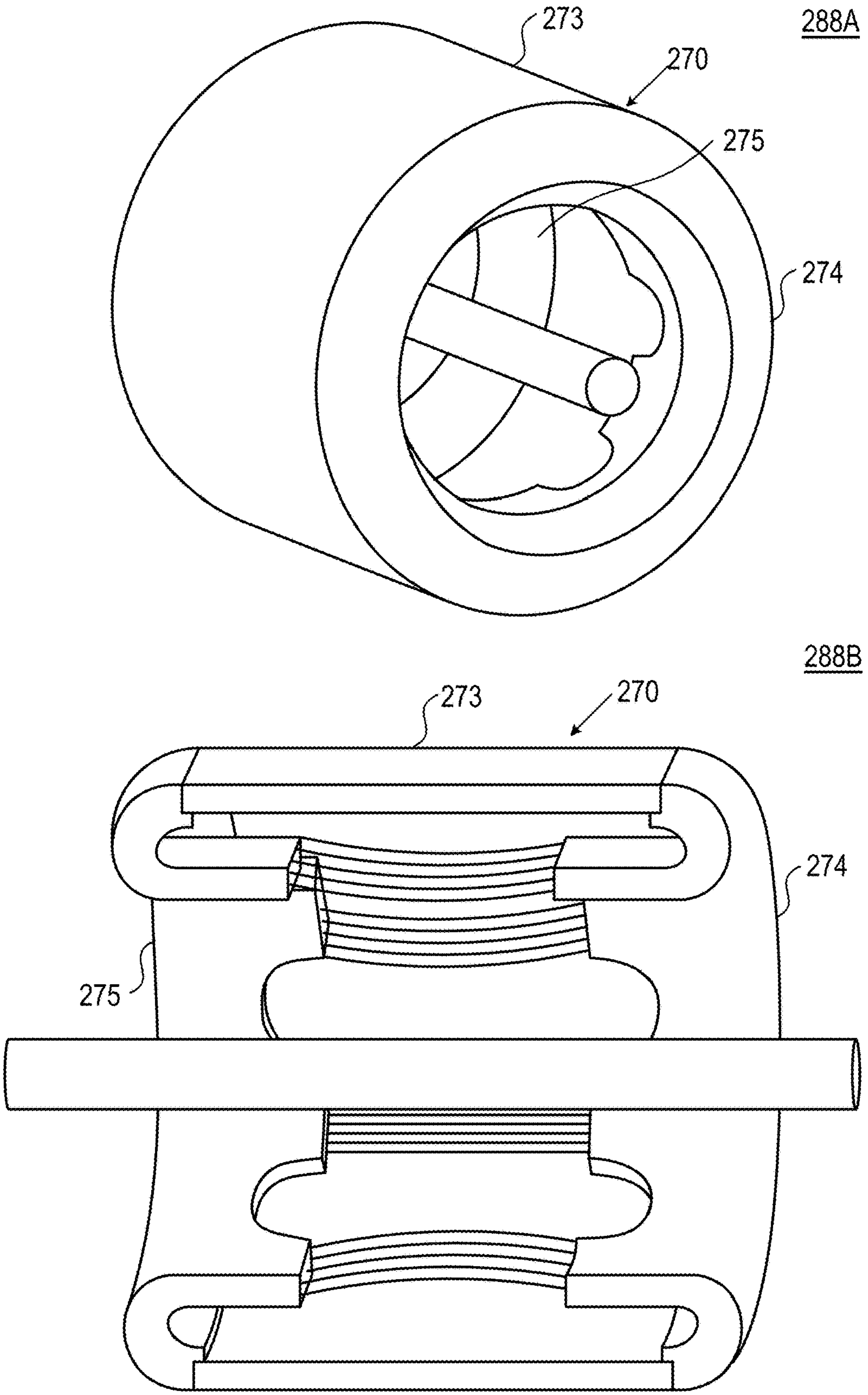
FIG. 2I shows an axially magnetized, tubular rotor including a cylindrical core member including and a plurality of first extensions and a plurality of second extensions which extend inwardly from the cylindrical core member, according to some embodiments of the present invention.

FIG. 2I shows two views 288A and 288B of an axially magnetized, tubular rotor 270 including a cylindrical core member 273 including and a plurality of first extensions 274 and a plurality of second extensions 275 which extend inwardly from the cylindrical core member 273, according to some embodiments of the present invention. Each of a plurality of first extensions 274 and a plurality of second extensions 275 may have a u-shape and extend inwardly towards the center of the rotational axis of cylindrical core member 273. As shown in FIG. 2I, a plurality of first extensions 274 and a plurality of second extensions 275 may extend inwardly towards a center level of the cylindrical core. As a result, extensions 274 and 275 may direct magnetic flux to return internally from North Pole located at extension 274 to South Pole located at extension 275.

Figure 2J:
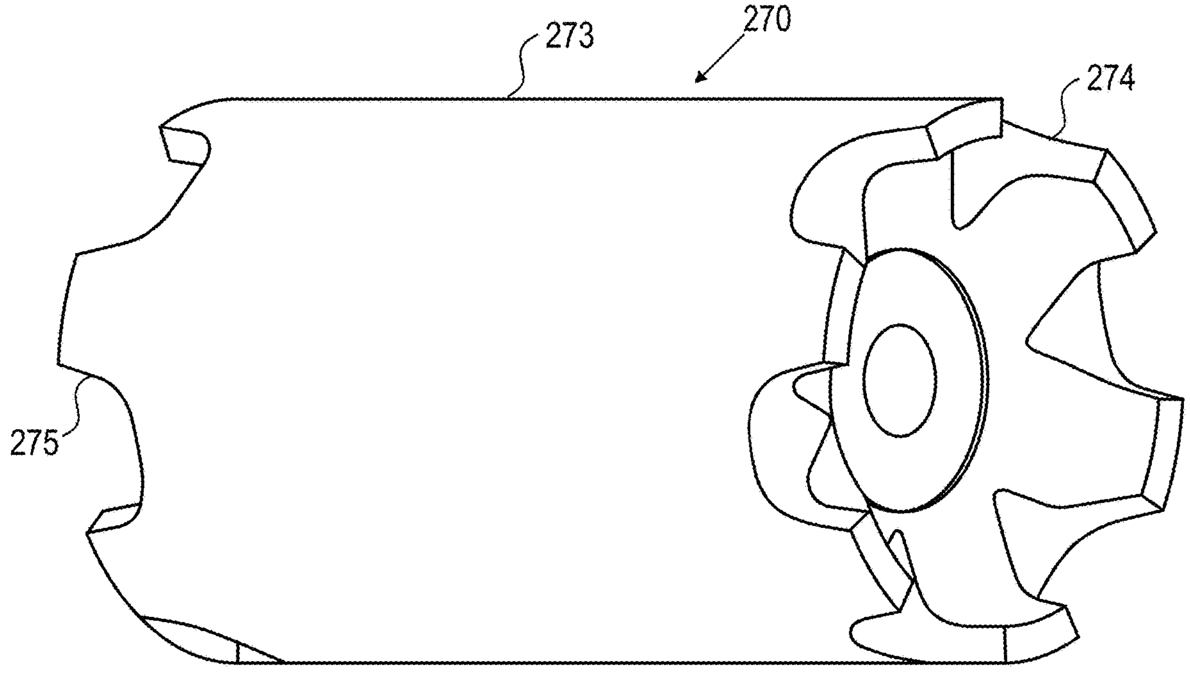
FIG. 2J shows a rotor of a crown brushless motor, wherein the cylindrical core and the plurality of first extensions and second extensions are made from a single solid permanent magnet part, according to some embodiments of the present invention.

FIG. 2J shows a rotor 270 of a crown brushless motor, wherein the cylindrical core member 273 and the plurality of first extensions 274 and second extensions 275 are made from a single solid permanent magnet part, according to some embodiments of the present invention.

Figure 2K:
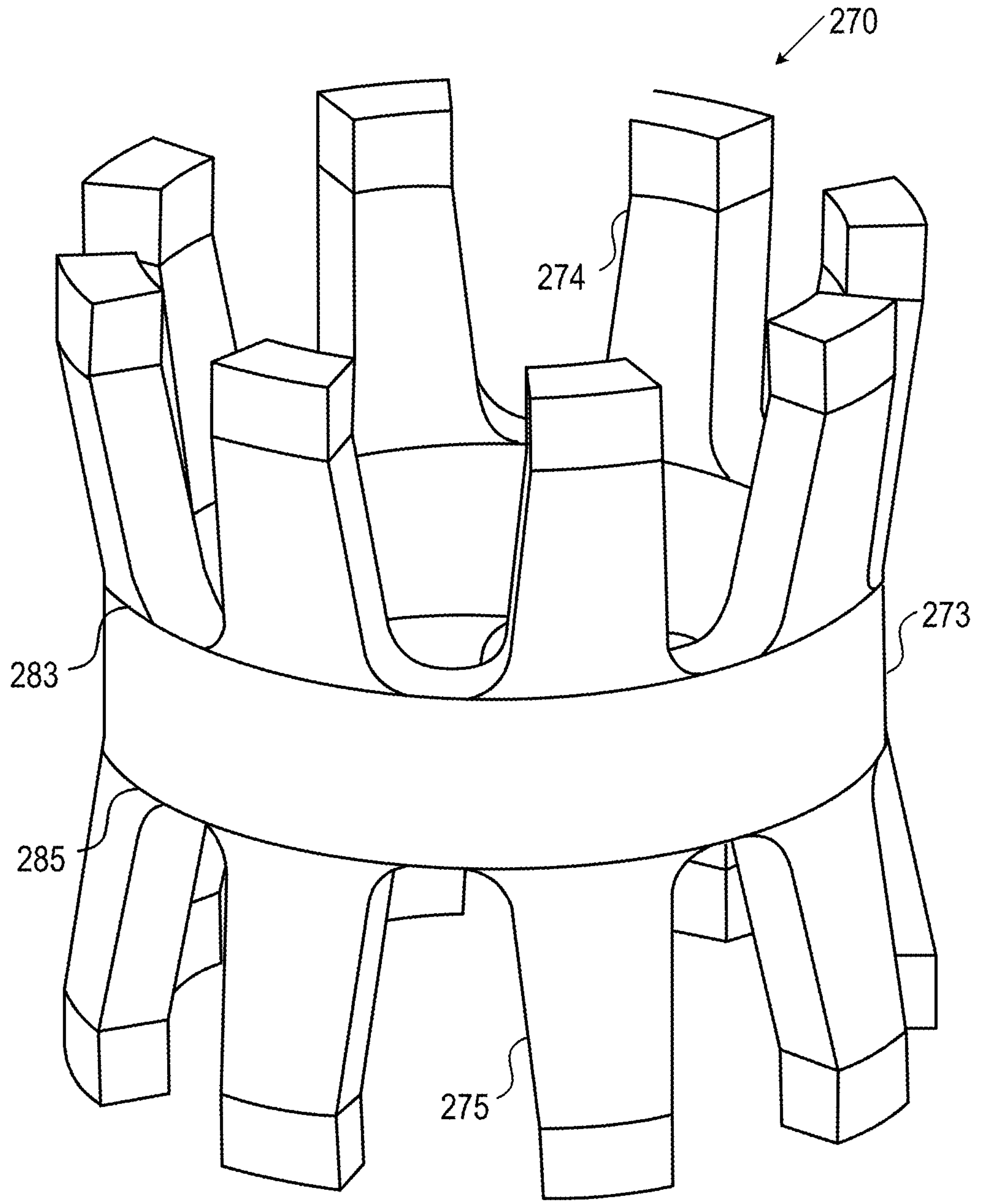
FIG. 2K shows a rotor which includes a plurality of first extensions and a plurality of second extensions, which are mounted to a cylindrical core and are axially magnetized and form a single solid permanent magnet rotor, according to some embodiments of the present invention.

FIG. 2K shows a rotor 270 which includes a plurality of first extensions 274 and a plurality of second extensions 275, which are mounted to a cylindrical core member 273 and are axially magnetized, according to some embodiments of the present invention. For example, cylindrical core member 273, extensions 274 and 275 may form a single solid permanent magnet rotor; or cylindrical core member 273 may be a permanent magnet and extensions 274 and 275 may be made from soft iron and may form a single solid permanent magnet rotor. For example, as shown in FIG. 2K, rotor 270 may include first extensions 274 and the second extensions 275 which are attached back-to-back to each other on crown rings 283 and 285. Crown rings 283 and 285 may form a cylindrical core member 273. First extensions 274 and the second extensions 275 located on crown rings 283 and 285, respectively, may be magnetized in opposite axial direction, thereby providing rotor 270 including extensions 274 which form the North Pole of rotor 270 and extensions 275 which form the South Pole of rotor 270. For example, rotor 270 may be a single permanent magnet.

Figure 2L:
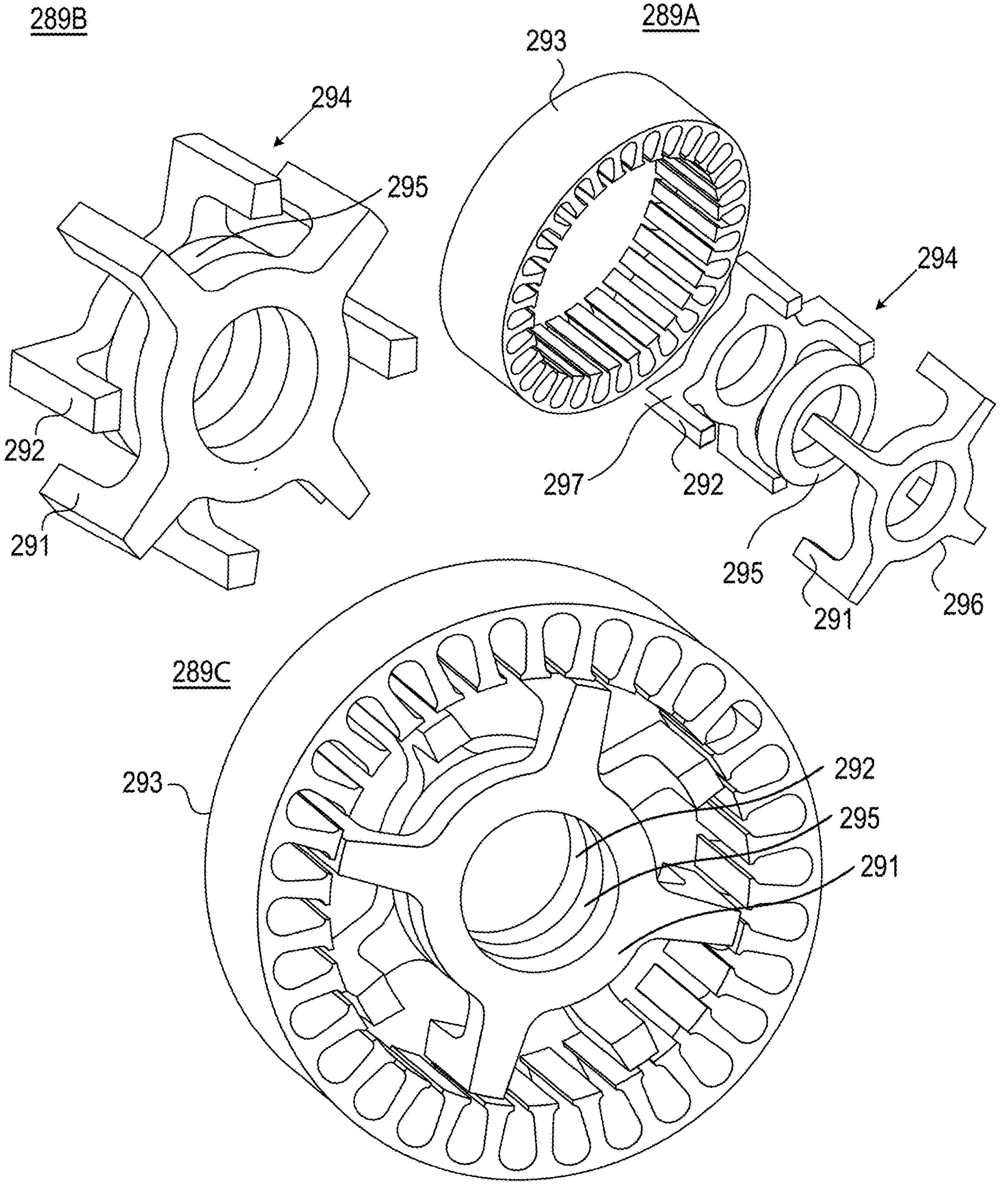
FIG. 2L shows an example of a part of a crown brushless motor in which a plurality of first extensions and a plurality of second extensions are interlaced, according to some embodiments of the present invention.

FIG. 2L shows three views 289A-289C of an example of a part of a crown brushless motor 290 in which a plurality of first extensions 291 and a plurality of second extensions 292 are interlaced, according to some embodiments of the present invention. In view 289A, brushless motor 290 may include a stator 293 and a rotor 294 which includes a cylindrical core member 295 which is sandwiched between a plurality of first extensions 291 and a plurality of second extensions 292. Extensions 291 and 292 may each include four extensions 291A-291D and 292A-292D. Extensions 291A-291D of first extensions 291 may be axially rotated relative to extensions 292A-292D of second extensions 292, e.g. by 45°. As a result of the axial rotation, extension 292A-292D of extension 292 may overlap ring 296 of extensions 291 and extensions 291A-291D of extensions 291 may overlap ring 297 of extensions 292. View 289B shows a rotor 294 and cylindrical core member 295 of rotor 294 may be sandwiched by extensions 291 and 292, and illustrates the relative positions of extensions 291 and 292 when interlaced. View 289C shows an arrangement of cylindrical core 295, extensions 291 and 292 within stator 293. Interlaced extensions, e.g. as shown in FIG. 2L, can advantageously provide additional stimulation between rotor and stator, e.g. compared to permanent magnets for prior art brushless motors as shown in FIG. 1B. Ends of extensions 291 and 292 shown in FIG. 2L may be spatially located in similar positions as permanent magnets 116 shown in FIG. 1B but are less likely to be affected by centrifugal forces than rotors shown in FIG. 1B.

Figure 3:
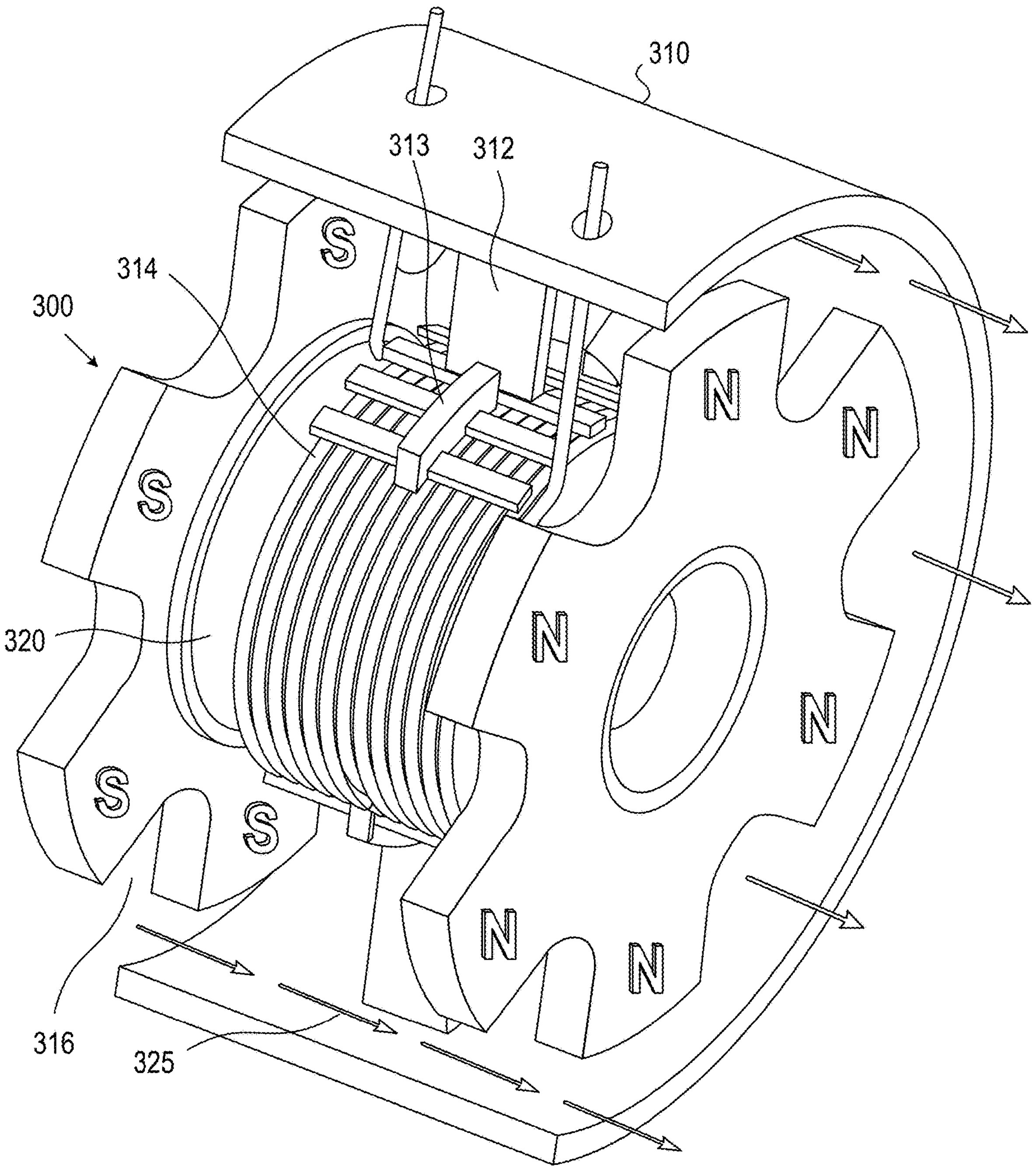
FIG. 3 shows a cross-section view of a crown brushless motor, according to some embodiments of the present invention.

FIG. 3 shows a cross-sectional view of a part of a crown brushless motor 300 including stator 310 and rotor 320, according to some embodiments of the present invention. Brushless motor 300 may include a laminated rotor 320, e.g. made from soft iron, a coiled wire 314 arranged around the cylindrical core members 321, e.g. a static coil 314 that is rigidly connected to stator 310 for example via frame 313 and radial lags 312. In some embodiments, a coiled wire arrangement 314, e.g. a static coil, may be mounted onto stator 310. A diameter of static coil 314 may be slightly larger than the diameter of cylindrical core 321. This arrangement between coiled wire 314 and cylindrical core 321 may allow rotor 320 to be magnetically energized, e.g. via induction upon use of the motor, and to rotate freely within coiled wire 314 located within stator 310. Openings 315 in the rotor flanges and/or space between cylindrical core member of rotor 321 and stator 310, may enable ventilation (e.g. air cooling) of rotor 320 and stator 310. For example, air flow 325 may be applied through space between rotor 320 and stator 310 to cool rotor 320 and stator 310.

Figure 4:
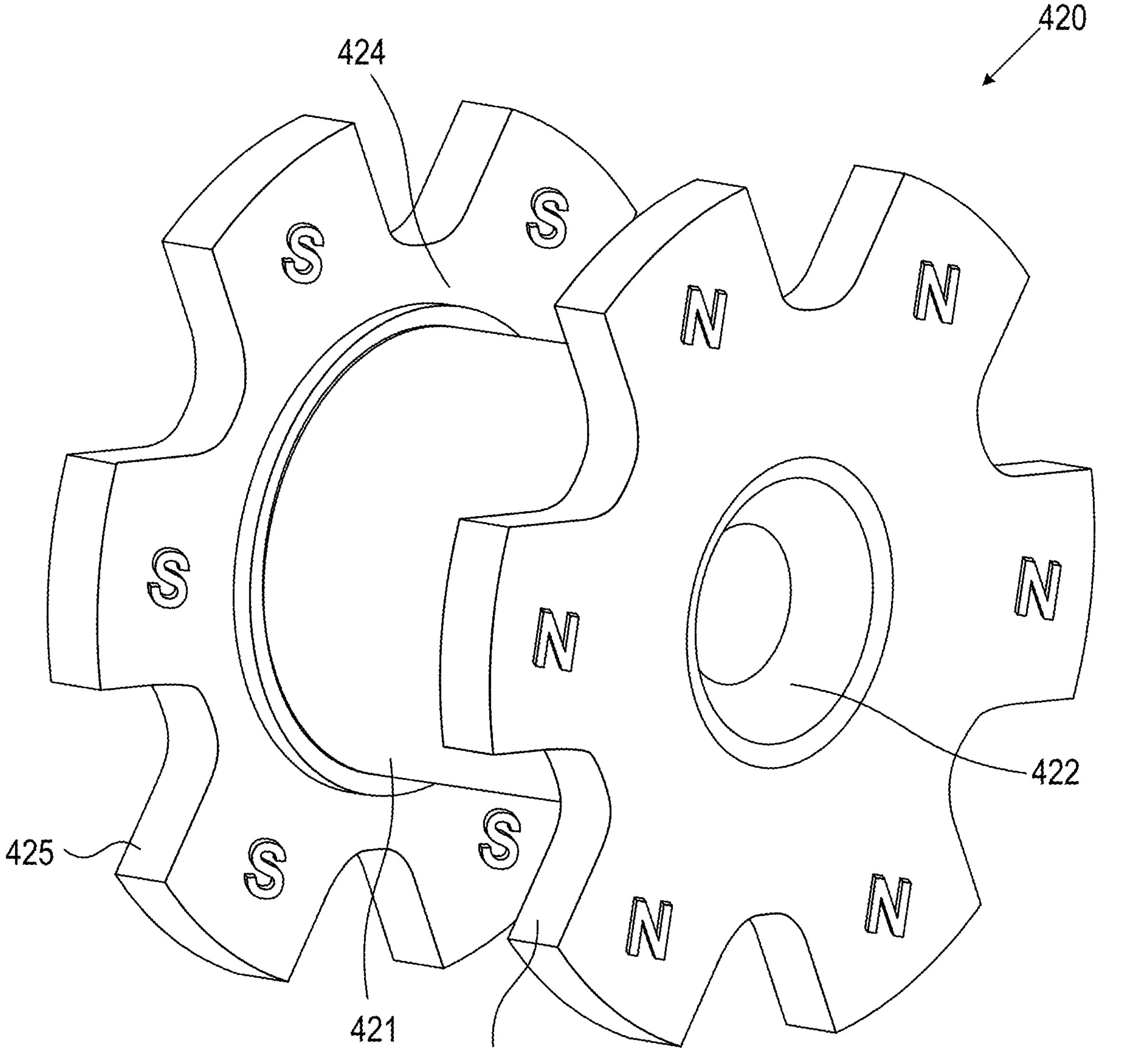
FIG. 4 shows a crown-like rotor made of soft iron laminated stack, according to some embodiments of the present invention.

FIG. 4 shows a crown-like rotor 420 made of a soft iron laminated stack, according to some embodiments of the present invention. Rotor 420 may have three sections: 1) A relatively small cylindrical rotor core 421; 2) a plurality of first extensions 422 extending from rotor core 421, which may be polarizable, e.g. to generate a North Pole with six North Pole radial extensions 423; and 3) a plurality of second extensions 424 extending from rotor core 421, which may be polarizable, e.g. to generate a South Pole with six South Pole radial extensions 425. An axial magnetization of cylindrical core member may be split between a plurality of first extensions 422 and a second extensions 424. First extensions 422 may be evenly arranged along a circumference of the first circular base and second extensions 424 may be evenly arranged along a circumference of the second circular base. For example, six radial extensions 423 of first extensions 422 may be located in angular intervals of 60° along the rotational axis of the cylindrical core member.

Figure 5:
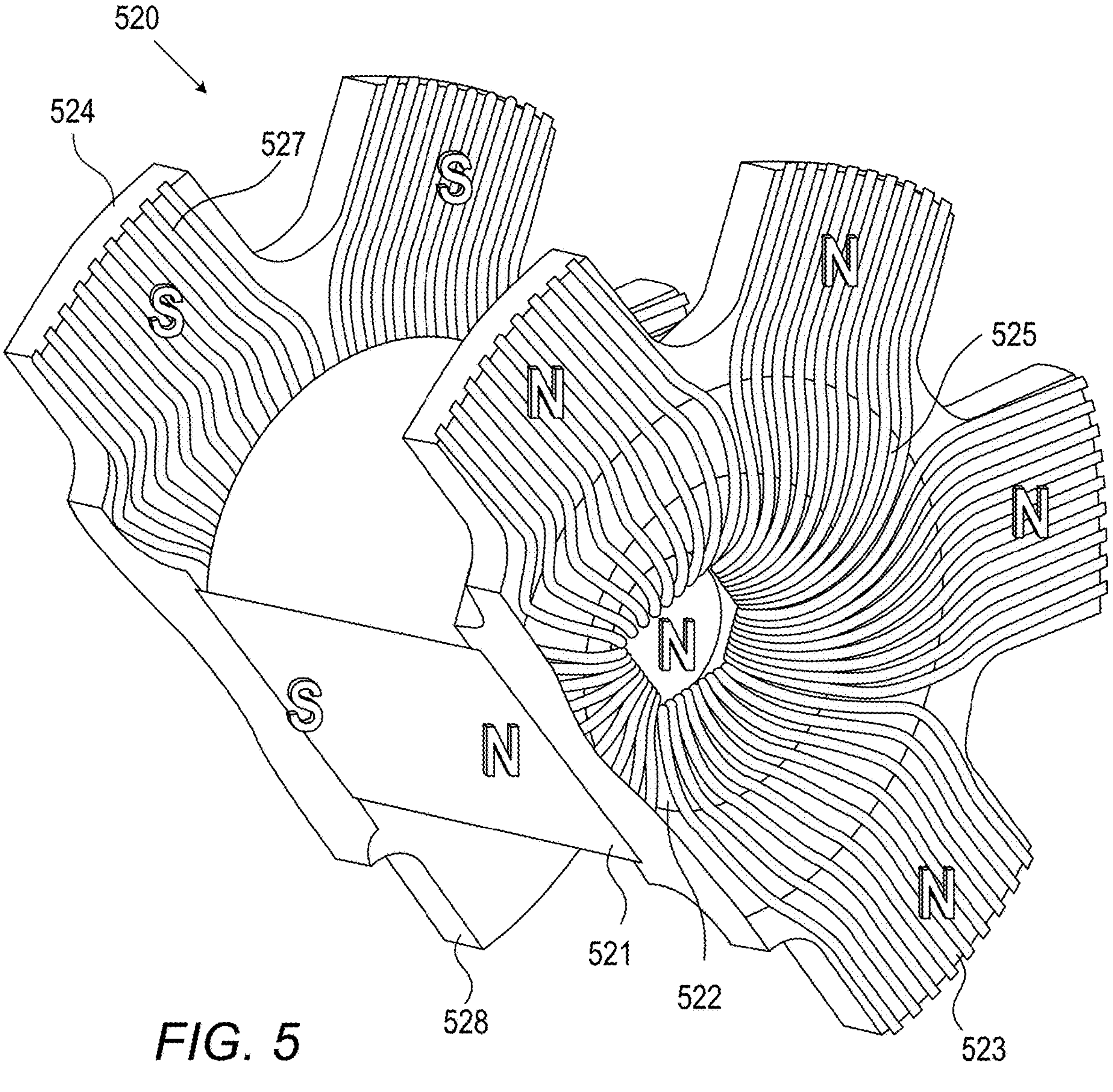
FIG. 5 shows a cross-section view of a rotor of a crown brushless motor representing an applied magnetic field as magnetic lines spread from the plurality of first extensions through a cylindrical core member to the plurality of second extensions, according to some embodiments of the present invention.

FIG. 5 shows a cross-sectional view of a rotor 520 of a crown brushless motor representing an applied magnetic field as magnetic lines 525, according to some embodiments of the present invention. Magnetic lines 525 may originate from the North Pole of cylindrical core member 521 through crown ring 522 and six radial North Pole extensions 523 (only four out of six extensions shown). Magnetic lines 527 may lead to the South Pole of cylindrical core member 521 via six radial South Pole extensions 524 (only four out of six extensions shown) and crown ring 528.

Figure 6:
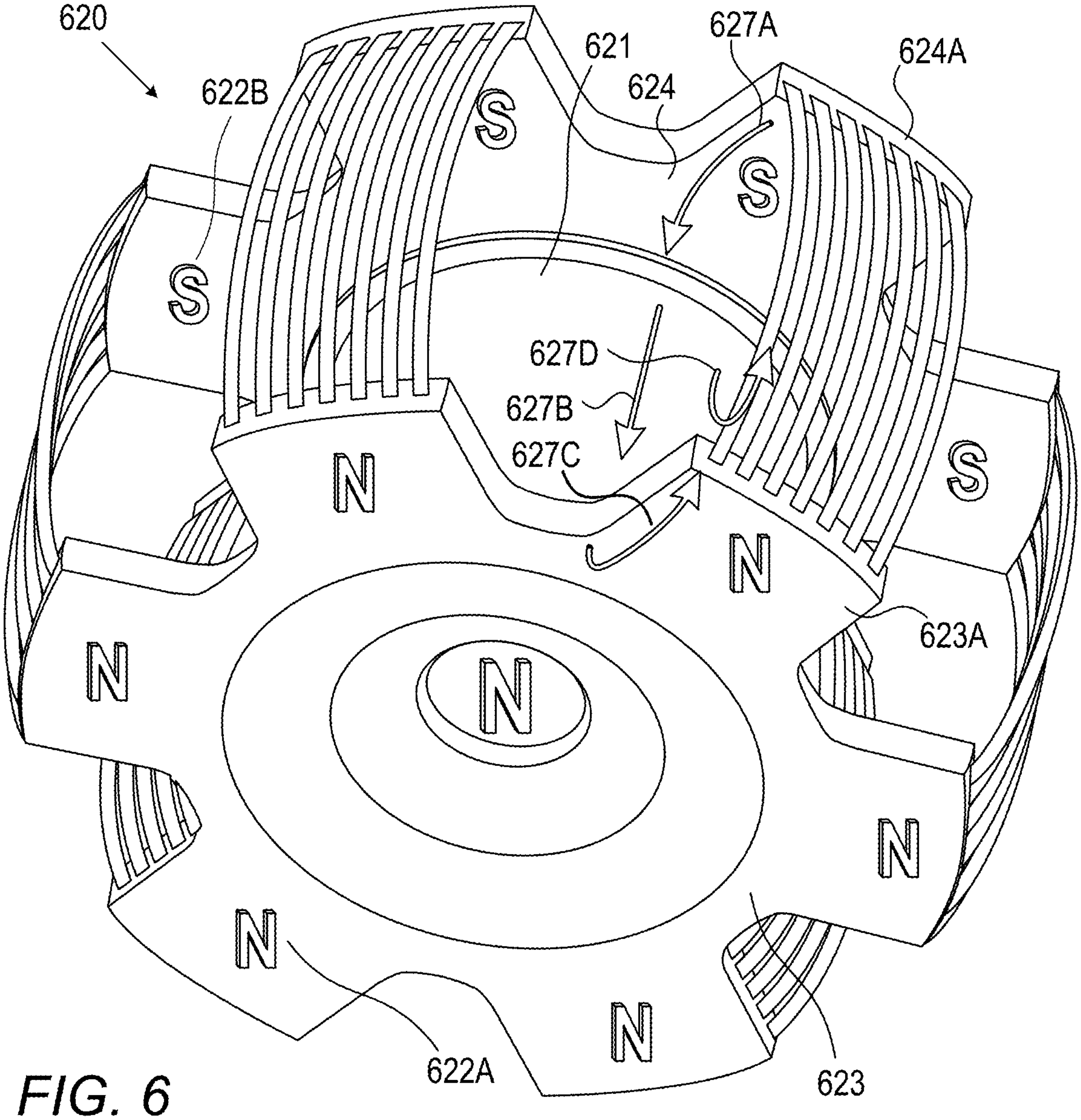
FIG. 6 shows the rotor having six first extensions and six second extensions including magnetic flux lines that illustrate the flow from the first extensions to the second extensions, according to some embodiments of the present invention.

FIG. 6 shows a rotor 620 having a cylindrical core member 621, six first extensions 623 located at North Pole 622A and six second extensions 624 located at South Pole 622B. First extensions and second extensions may be configured to induce a flow of magnetic flux from the first extensions 623A-623F to second extensions 624A-624F. Magnetic flux in this arrangement may be illustrated by magnetic flux 627A-627D: Magnetic flux located at North Pole 622A may be directed outwardly by extension 623A (step 627C) and may transition to extension 624A located at South Pole 622B (step 627D). Magnetic flux may transition inwardly to the South Pole (step 627A) and may transition to North Pole 622A within cylindrical core member 621 (step 627B).

Figure 7:
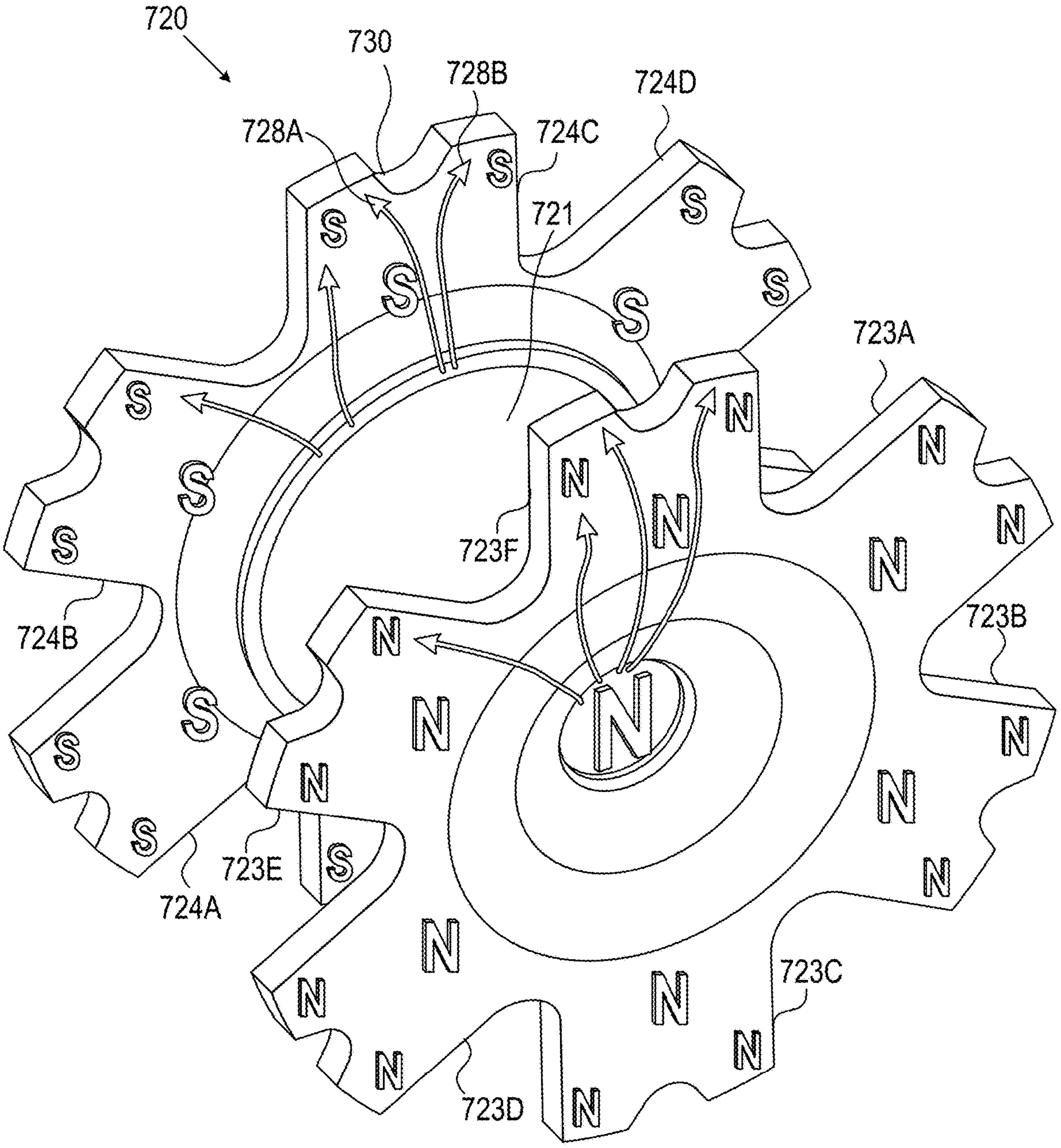
FIG. 7 shows a rotor including a cylindrical core member, wherein each extension of the first extensions and each extension of the second extensions is separated by a groove which separates each extension into an extension pair, according to some embodiments of the present invention.

FIG. 7 shows a rotor 720 including a cylindrical core member 721, wherein each extension of the first extensions 723A-723F and each extension of the second extensions 724A-724F (only 724A-724D shown in FIG. 7) may be separated by grooves, e.g. groove 730, which separates each extension into an extension pairs, according to some embodiments of the present invention. First extensions 723A-723F may include six extension pairs which when polarized lead to twelve North polarized magnetic poles. Second extensions 724A-724F include six extension pairs which when polarized lead to twelve South polarized magnetic poles. For example, each extension of an extension pair generated via groove 730 in extension 724C may divide a single South polarized extension 724C into two polarizations as indicated by arrows 728A and 728B. Separation of first extensions and second extensions into extension pairs may allow enhancing the precision of rotor 720 when interacting with electromagnets of a stator, e.g. electromagnets 933 shown in FIG. 9., for example to adjust the speed of rotor 720 to a required mechanical output of a motor.

Figure 8:
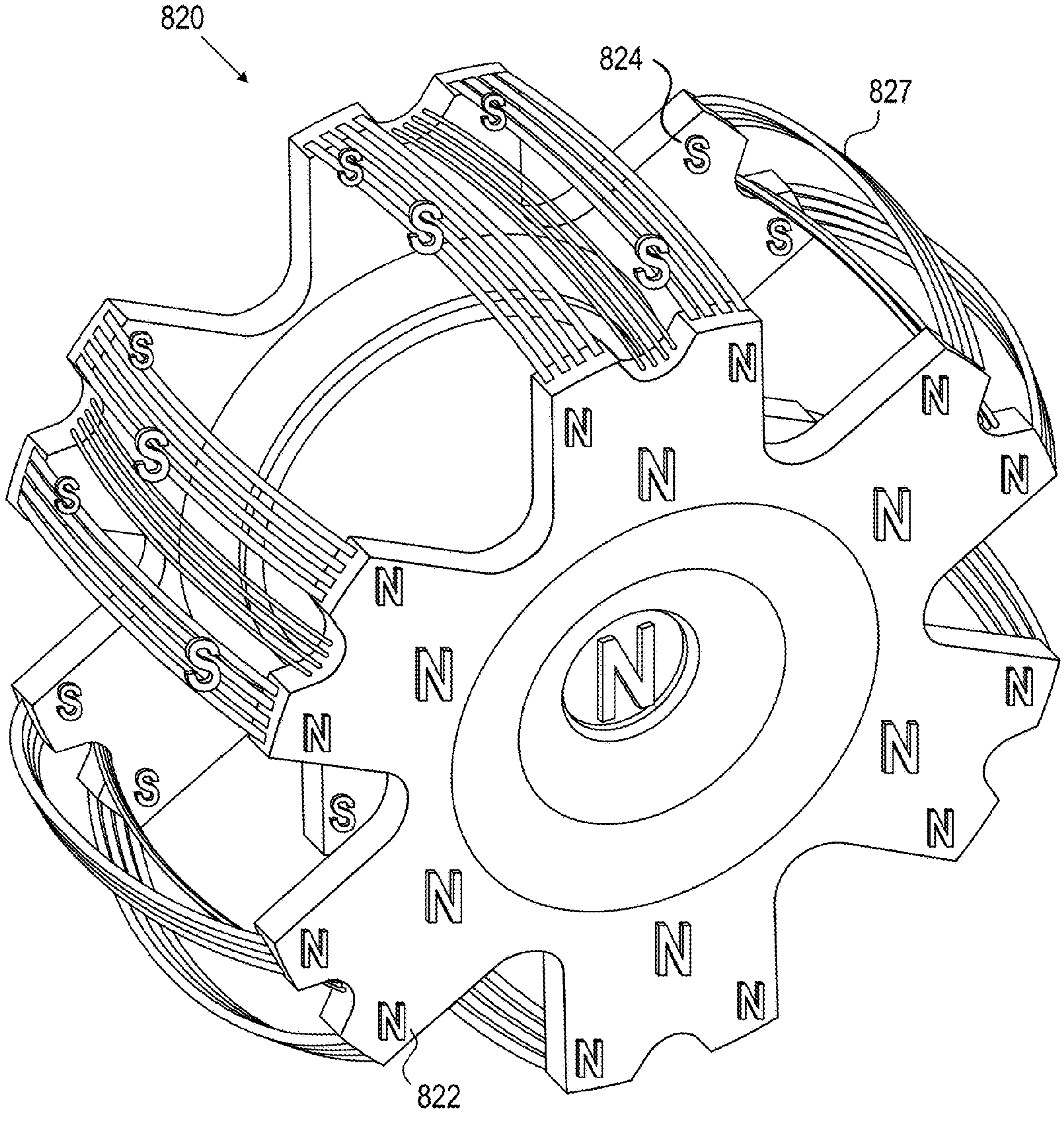
FIG. 8 shows a rotor arrangement in which the rotor has having primary and secondary splitting and twelve North Poles and twelve South Poles, and illustrate the magnetic flux lines that flow from the North Poles to the South Poles at the free air media, according to some embodiments of the present invention.

FIG. 8 shows a rotor arrangement in which rotor 820 has a primary and secondary splitting leading to twelve North Poles 822 and twelve South Poles 824, and illustrate the magnetic flux lines 827 that flow from the North Poles 822 to the South Poles 824 through air, according to some embodiments of the present invention.

Figure 9:
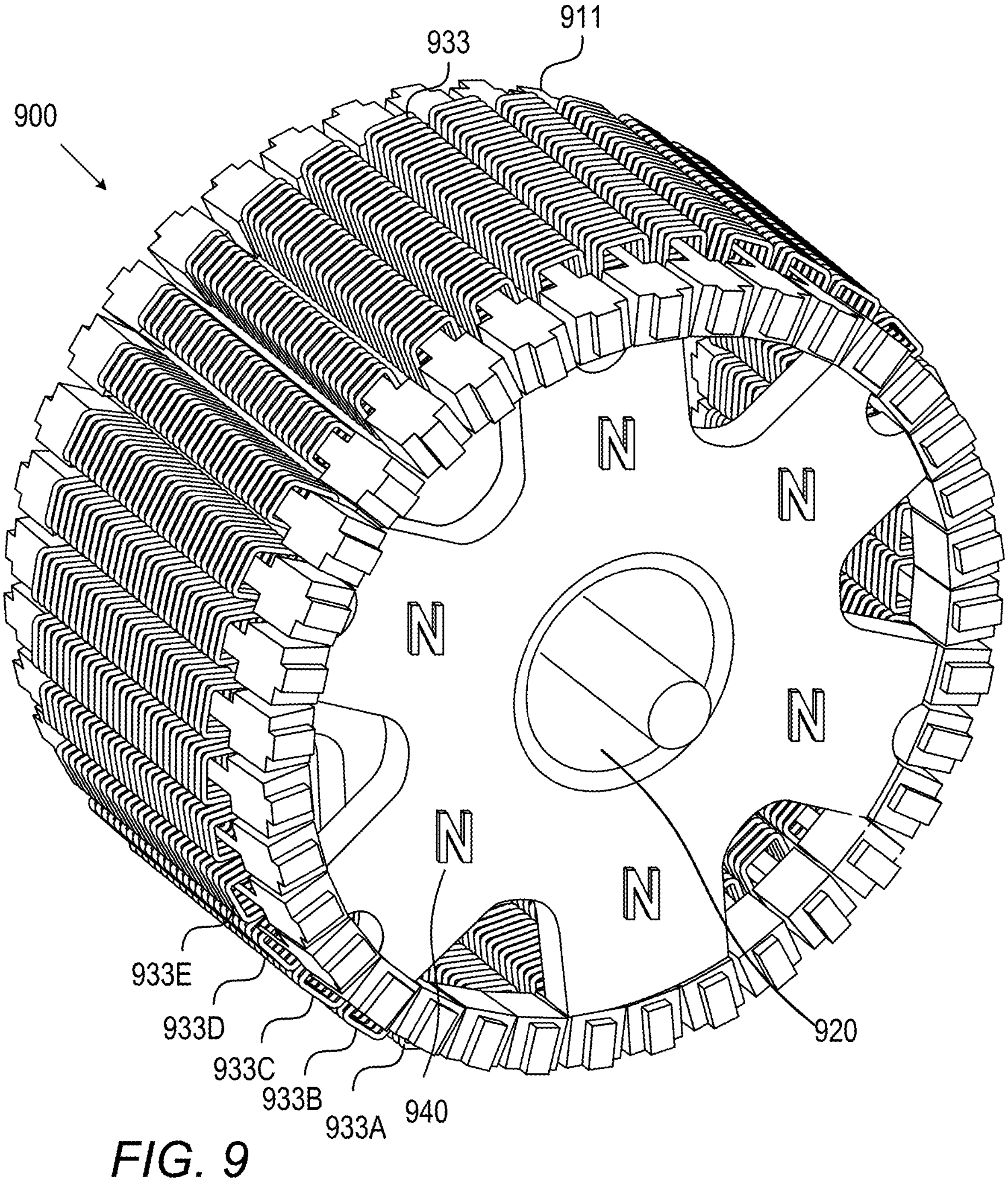
FIG. 9 shows a crown brushless motor which includes a plurality of electromagnets which are concentrically mounted to a stator and surround the rotor, according to some embodiments of the present invention.

FIG. 9 shows a crown brushless motor 900 which includes a plurality of electromagnets 933, e.g. 36 electromagnets, which are concentrically mounted to a stator 911 and surround rotor 920, according to some embodiments of the present invention. For example, electromagnets may be arranged radially around the rotational axis of the rotor. For example, the plurality of electromagnets may be attached to the stator. Each of the electromagnets 933 of stator 911 may surround a section of an extension of the first extensions and a section of an extension of the second extensions. For example, as shown in FIG. 9, North Pole polarized extension 940 may be surrounded by electromagnets 933A-933E. Each of the plurality of electromagnets may be polarizable to generate a repulsion force between a magnetic field of the one or more electromagnets and a magnetic field of the rotor. Each of the plurality of electromagnets may be polarizable to generate an attraction force between a magnetic field of the one or more electromagnets and a magnetic field of the rotor. Thus, motor 900 may be configured to adjust torque and/or rotational speed of the cylindrical core member by activating one or more electromagnets of the plurality of electromagnets located at the stator 911.

Since electromagnets 933 of stator 911 may be located outside of a cylindrical core member 920, a crown brushless motor 900 may enable a configuration of a stator 911 that includes a significantly higher number of electromagnets compared to the number of electromagnets shown in FIGS. 1A and 1B. In the arrangement of magnets shown in FIGS. 1A and 1B, the magnets 103 are located inside the rotor 100 which limits the number of magnets 103 to the size of the cylindrical core member of the rotor, e.g. the diameter of the cylindrical core member. Thus, a brushless motor 900 as shown in FIG. 9 or rotor 270 as shown in FIG. 2H may allow the preparation of a stator 911 with a significantly higher number of electromagnets 933, e.g. a stator may include 36 electromagnets as shown in FIG. 9, which is significantly higher than the number of magnets 103 shown in FIG. 1A or 1B. A large number of electromagnets 933 may allow the design of a crown brushless motor with a high number of poles, and thus a higher precision in the operation of a brushless motor to motors known in the art.

Figure 10:
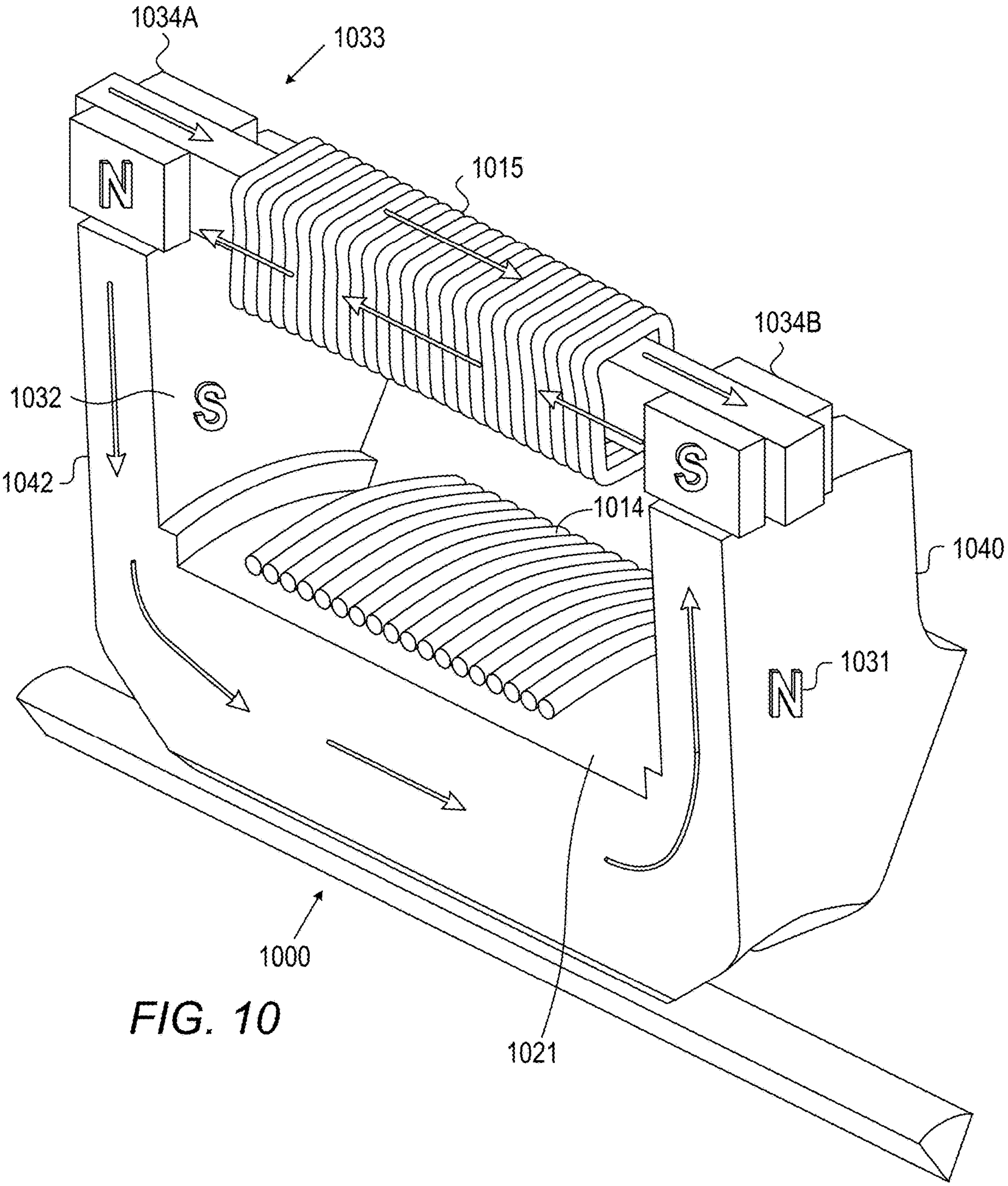
FIG. 10 shows a cross-section view of a rotor and surrounding electromagnets, according to some embodiments of the present invention.

FIG. 10 shows a cross-section view of a rotor 1000 and surrounding electromagnet 1033, according to some embodiments of the present invention. Rotor 1021 may include laminated cylindrical core member 1021, which is surrounded by a coiled wire, e.g. rotor coil 1014 and a section of electromagnets, e.g. one of 36 electromagnets 1033 of a stator. For example, rotor coil 1014 may be activated, e.g. energized by an applied current, to create a magnetization of rotor 1000 and a plurality of first extensions 1040 form a North Pole 1031 of rotor 1000 and a plurality of second extensions 1042 form a South Pole 1032 of rotor 1000. Activation of electromagnet 1033, e.g. via applying a current to electromagnet coil 1015, may lead to the induction of a polarity of electromagnet 1033 and North Pole 1034A may be induced in close proximity relative to South Pole 1032 of rotor 1000 and South Pole 1034B may be induced in close proximity relative to the North Pole 1031 of rotor 1000. In such an arrangement, attraction forces may apply between electromagnet North Pole 1034A and rotor South Pole 1032 and between electromagnet South Pole 1034B and rotor North Pole 1031. Activating electromagnet 1033 in opposite direction may produce repulsion forces between the rotor poles and the electromagnet poles: Activation of electromagnet 1033 may lead to the induction of a polarity of electromagnet 1033 and a South Pole 1034A may be induced in close proximity relative to the South Pole 1032 of rotor 1000 and a North Pole 1034B may be induced in close proximity relative to the North Pole 1031 of rotor 1000. In such an arrangement, repulsion forces may apply between electromagnet North Pole 1034A and rotor South Pole 1032 and between electromagnet South Pole 1034B and rotor North Pole 1031.

FIGS. 11A, 11B, 11C, 11D illustrate activation steps in an activation sequence of rotor 1140 and stator electromagnets 1133 of stator 1111 in order to rotate the rotor 1140 of a motor 1100.

Figure 11A:
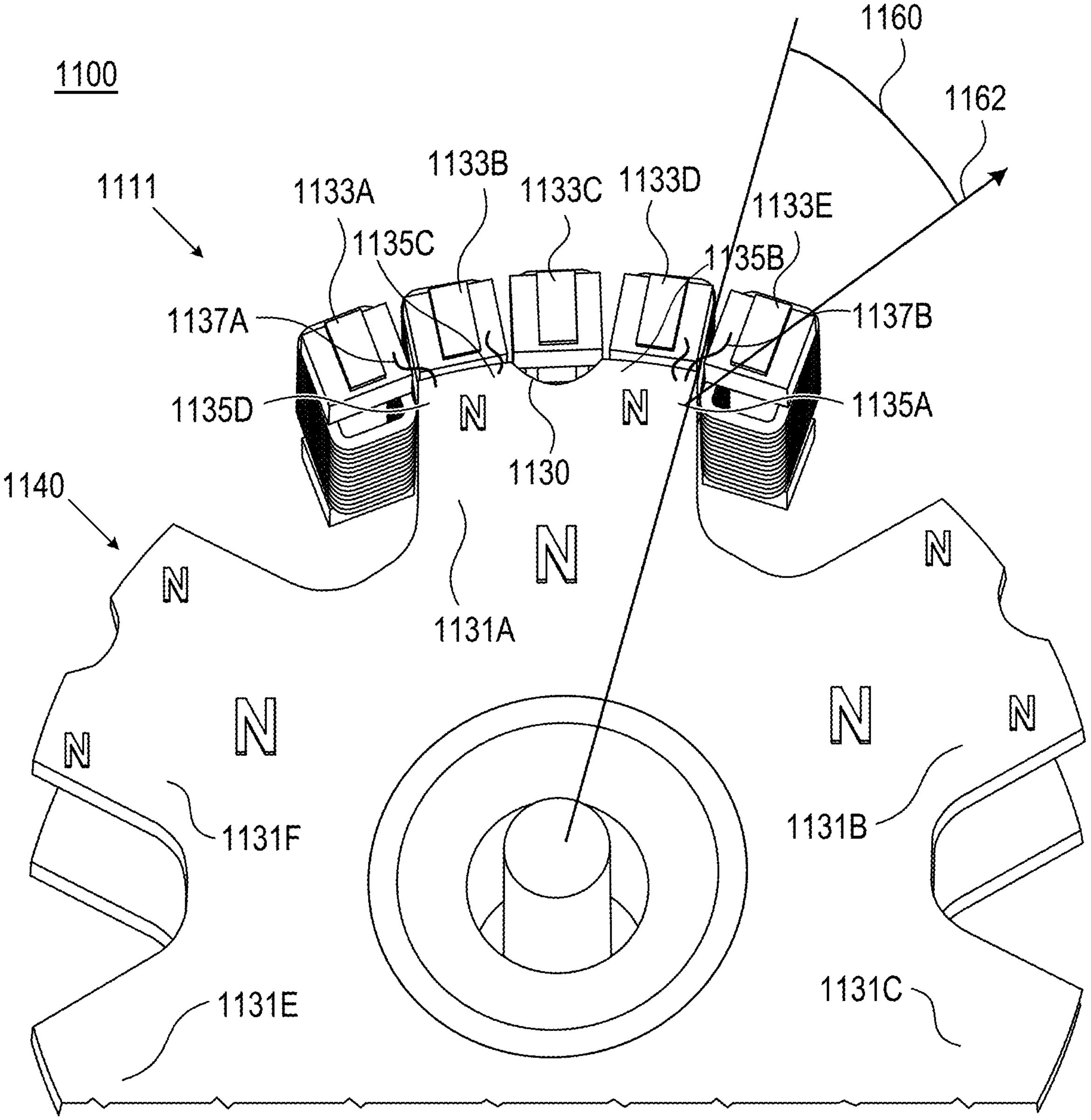
FIG. 11A shows a section of a laminated, radial rotor having a plurality of six first extensions, wherein each extension is separated into an extension pair by a groove, and wherein each extension is in close proximity to five electromagnets, according to some embodiments of the present invention.

FIG. 11A shows a section of a laminated, radial rotor 1140 having a plurality of six first extensions 1131A-1131F (only extensions 1131A, 1131B, 1131C, 1131E and 1131F shown in FIG. 11A), wherein each extension is separated by grooves, e.g. groove 1130, into an extension pair, e.g. providing six extension pairs, according to some embodiments of the present invention. Each extension pair may be in close proximity to five electromagnets. For example, close proximity between extension pairs and electromagnets may be a distance between 10 and 100 microns, for example 50 microns. To simplify the illustration, electromagnets surrounding remaining extensions 1131B-1131F have been omitted from FIG. 11A and only electromagnets 1133A-1133E surrounding extension pair 1131A are shown in FIG. 11A. Five electromagnets 1133A-1133E may be in close proximity to edges 1135A and 1135D of extension pair 1133A, and these electromagnets 1133A-1133E may be activated, e.g. in a pre-set sequence (e.g. a specific activation algorithm and timing) to produce a push and/or pull force, e.g. as described in FIG. 10 and FIGS. 11B-11D which allows rotor 1140 achieving a desired torque and/or rotational speed:

Upon activation of the magnetization of rotor 1140 and activation of electromagnets of stator 1111, electromagnets 1133A and 1133B may be in close proximity to edges 1135C and 1135D (see FIG. 12 for an additional view of the arrangement) of rotor 1140 and may provide a push and/or pull force against edges 1135C and 1135D. Electromagnets 1133D and 1133E may be in close proximity to edges 1135A and 1135B of rotor 1140 and may generate a push and/or pull force against edges 1135A and 1135B. Electromagnet 1133C may be located above groove 1130 and may be neutralized in its polarization. Neutralization of electromagnet 1133C may occur as a result of two effects: 1) Groove 1130 below electromagnet 1133C may generate an air gap between the core of electromagnet 1133C and rotor 1140; and 2) by activating electromagnet 1133C in opposite direction to the main magnetic flux direction, e.g. as shown in step 627D of FIG. 6, e.g. further illustrated in FIG. 14, and by controlling the magnetization of electromagnet 1133C in order to counter a magnetic field produced by rotor 1140 in direction of groove 1130.

Shape and size of grooves, e.g. groove 1130, between extension pairs, air gaps between electromagnet of rotor and blockage of some of the stator electromagnets, e.g. by inverse polarization or defined polarization strength of electromagnets may allow controlling a pulling/pushing vector angle and, thus, the speed of rotation of a rotor, e.g. rotor 1140. For example, stator electromagnets 1133 may be unpolarized at a specific vector angle such as a vector angle 1160 derived from a radial direction leading to vector 1162, e.g. when the pulling/pushing vector angle 1160 is larger than 75 arc deg. (almost radial) and a resulting rotational vector at this angle is negligible, e.g. as shown by attraction lines 1705 and vector 1708 shown in FIG. 17.

Figure 11B:
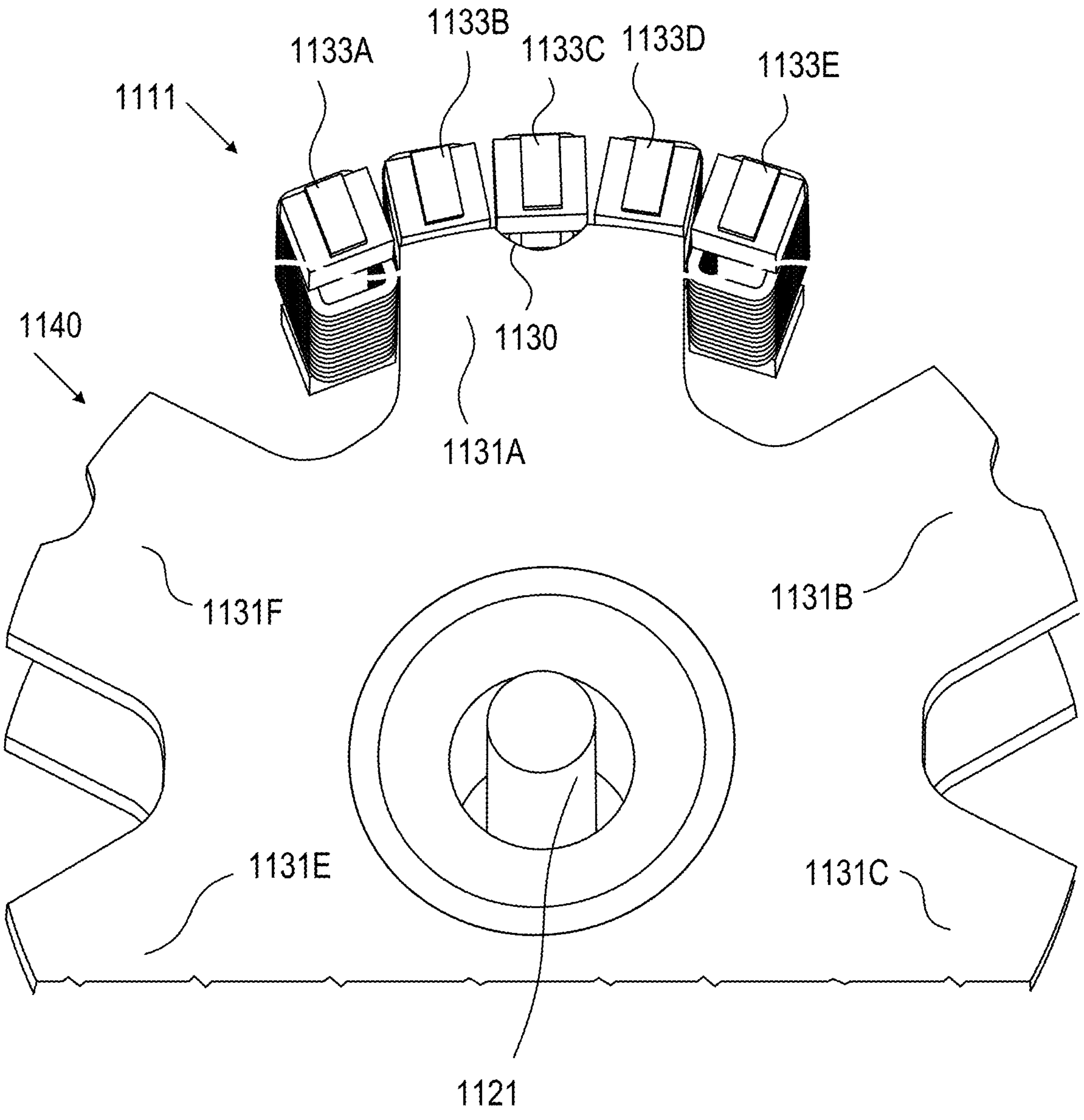
FIG. 11B shows a soft iron-laminated stack rotor wherein the rotor is unpolarized, according to some embodiments of the present invention.

FIG. 11B shows a soft iron-laminated stack rotor 1140, wherein the rotor is unpolarized, according to some embodiments of the present invention. In an unpolarized state of rotor 1140, there may be no magnetic forces between rotor 1140 and stator electromagnets 1133, e.g. electromagnets 1133A-1133E. During activation of a rotor 1140, e.g. by applying electrical energy to a coiled wire arranged around the cylindrical core member 1121 of rotor 1140, rotor 1140 may be activated, e.g. from an inactivated, soft steel based cylindrical core member 1121 to an activated cylindrical core member 1121 including a plurality of first extensions such as six extension pairs 1131A-1131F which are polarized to form twelve North Poles, and a plurality of second extensions such as six extension pairs 1132A-1132F which are polarized to form twelve South Poles as shown in FIG. 11A. FIG. 11A illustrates an example motor arrangement in which extension pair 1131A functions as a North Pole and is in close proximity to electromagnets 1133A, 1133B, 1133D, and 1133E. Interaction between polarized extension pair 1131A and unpolarized electromagnets 1133A-1133E may lead to the occurrence of high pull forces between rotor and stator electromagnets (illustrated by 1137A and 1137B). A pull force to electromagnet 1133C may be negligible since 1133C may be located opposite to groove 1130. In this activation state, rotor 1140 and electromagnets 1133 of a stator 1111, e.g. magnets 1133A-1133E, may be balanced and rotor 1140 does not rotate.

Figure 11C:
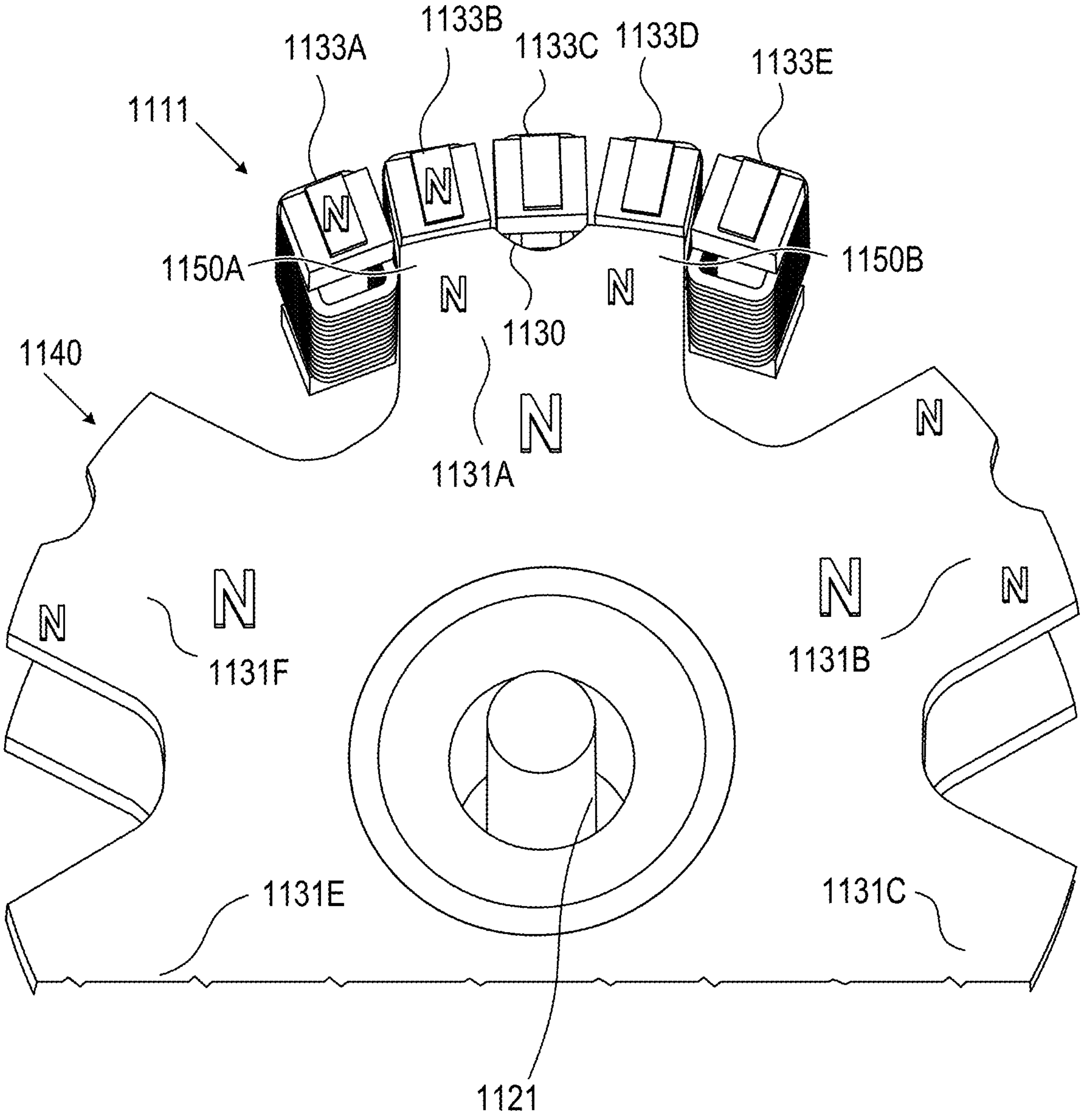
FIG. 11C shows a magnetized rotor which is surrounded by electromagnets, wherein the electromagnets are partially activated.

FIG. 11C shows a magnetized rotor 1140 and illustrates interactions between rotor 1140 and stator 1111 for an extension pair 1131A which is surrounded by five partially activated electromagnets 1133A-1133E, according to some embodiments of the present invention. Stator electromagnets 1133C, 1133D and 1133E may not be activated (e.g. they are not polarized), and electromagnets 1133A and 1133B may be activated (e.g. they may be polarized). As a result, North Poles of 1133A and 1133B may be in close proximity to North Pole 1/1150A of extension pair 1131A of rotor 1140 and repellent forces may arise between electromagnets 1133A and 1133B, and edges 1135C and 1135D of North Pole 1150A. Consequently, attraction forces may be present between electromagnets 1133D and 1133E and edges 1135A and 1135B of extension pair 1131A, and repellent forces may be present between electromagnets 1133A and 1133B and edges 1135C and 1135D of extension pair 1131A. Interplay of attraction forces and repellent forces may lead to a rotation of rotor 1140, e.g. in clockwise direction.

Since there may be attraction forces between rotor North Pole 1150B of extension pair 1131AA and electromagnets 1133D and 1133E, rotation of rotor 1140 may be achieved by only activating and controlling electromagnets 1133A and 1133B that may produce repellent forces against rotor North Pole 1150A of extension pair 1131A. Consequently, a rise in attraction forces between rotor North Pole 1150B and electromagnets 1133D and 1133E can initiate rotation of rotor 1140.

Figure 11D:
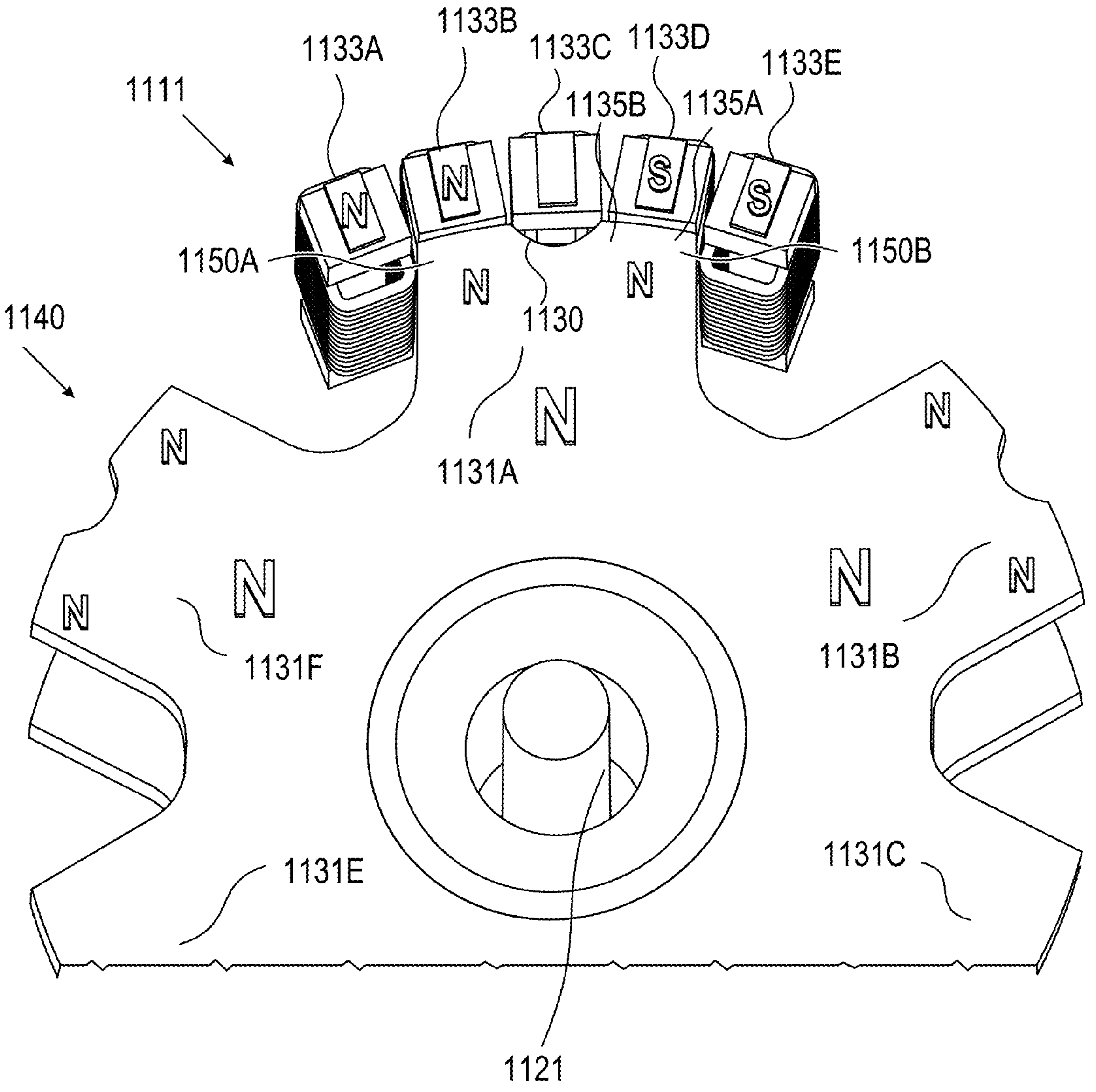
FIG. 11D shows a magnetized rotor which is surrounded by electromagnets, wherein each of the plurality of electromagnets is polarizable to generate a repulsion force between a magnetic field of the one or more electromagnets and a magnetic field of the rotor or an attraction force between a magnetic field of the one or more electromagnets and a magnetic field of the rotor, according to some embodiments of the present invention.

FIG. 11D shows a magnetized rotor 1140 and illustrates interactions between rotor 1140 and stator 1111 for an extension pair 1131A which is surrounded by five electromagnets 1133A-1133E, wherein each of the electromagnets is polarizable to generate a repulsion force between a magnetic field of the electromagnets and a magnetic field of the rotor or an attraction force between a magnetic field of the electromagnets and a magnetic field of the rotor, according to some embodiments of the present invention. FIG. 11D shows an example arrangement that follows the arrangement described in FIG. 11C, but in FIG. 11D, electromagnets 1133D and 1133E may be activated and may have South Poles of electromagnets 1133D and 1133E in close proximity to rotor North Pole 1150B of extension pair 1131A. Attraction forces between electromagnets 1133D and 1133E and rotor edges 1135A and 1135B of extension pair 1131A may be higher than in the arrangement illustrated in FIG. 11C. In summary, attraction and repellent forces may lead to a rotation of rotor 1140, now at a higher moment rotational moment in comparison to the rotational moment illustrated in FIG. 11C.

For a case that a stator has 36 electromagnets, e.g. as shown in FIG. 9, a motor can produce a maximum torque when all 36 electromagnets are activated, e.g. polarized. Activation of electromagnets may proceed in sub-groups of electromagnets, e.g. six sub-groups of six electromagnets when a stator includes 36 electromagnets. Sub-groups of electromagnets may be activated in parallel, for example each sub-group of electromagnets can be activated individually by an activation method or sequence. As a result, a motor may function, e.g. a rotor of a motor can rotate, when only one or more sub-groups of all electromagnets are activated. A produced torque may dependent on the number of activated electromagnet sub-groups. For example, in case that a stator includes 36 electromagnets, activation of a subgroup of six electromagnets can only produce a torque that is ⅙ of the torque which may be produced when all 36 electromagnets of the stator are activated.

As illustrated by FIGS. 11A-11D, one embodiment may include a method of activating a crown brushless motor, e.g. motor 1100, for example, a crown brushless motor including a stator, e.g. stator 1111, including: a plurality of electromagnets such as electromagnets 1133, wherein the plurality of electromagnets 1133 is radially arranged around the rotor axis, of rotor 1140; and rotor 1140 including a cylindrical core member, e.g. core member 1121, including: a plurality of first extensions, e.g. extensions 1131, extending from a first end of the cylindrical core member, and a plurality of second extensions, e.g. extensions 1132, extending from a second end of the cylindrical core member 1121, wherein each of the plurality of first extensions 1131 and each of the plurality of second extensions 1132 are separated by a groove, e.g. groove 1130, which separates each plurality of extensions 1131 and 1132 into extension pairs, e.g. extensions pairs 1131A-1131F and 1132A-1132F; and a coiled wire 1114 arranged around the cylindrical core member 1121; including the steps of: a) magnetically activating wire 1114 to polarize the first and the second extension pairs, e.g. extension pairs 1131A-1131F and 1132A-1132F of the rotor 1140; and b) magnetically activating one or more electromagnets 1133 of the stator 1111 to create a magnetization that leads to a repulsion force between the one or more electromagnets 1133 and a first section of the extension pairs 1131A-1131F and 1132A-1131F, thereby rotating rotor 1140. In some embodiments, a method of activating a crown brushless motor, e.g. motor 1100 includes a step of: magnetically activating one or more electromagnets 1133 of stator 1111 to create a magnetization that leads to an attraction force between the one or more electromagnets 1133 and a second section of the extension pairs, e.g. extension pairs 1131A-1131F and 1132A-1132F.

Figure 12:
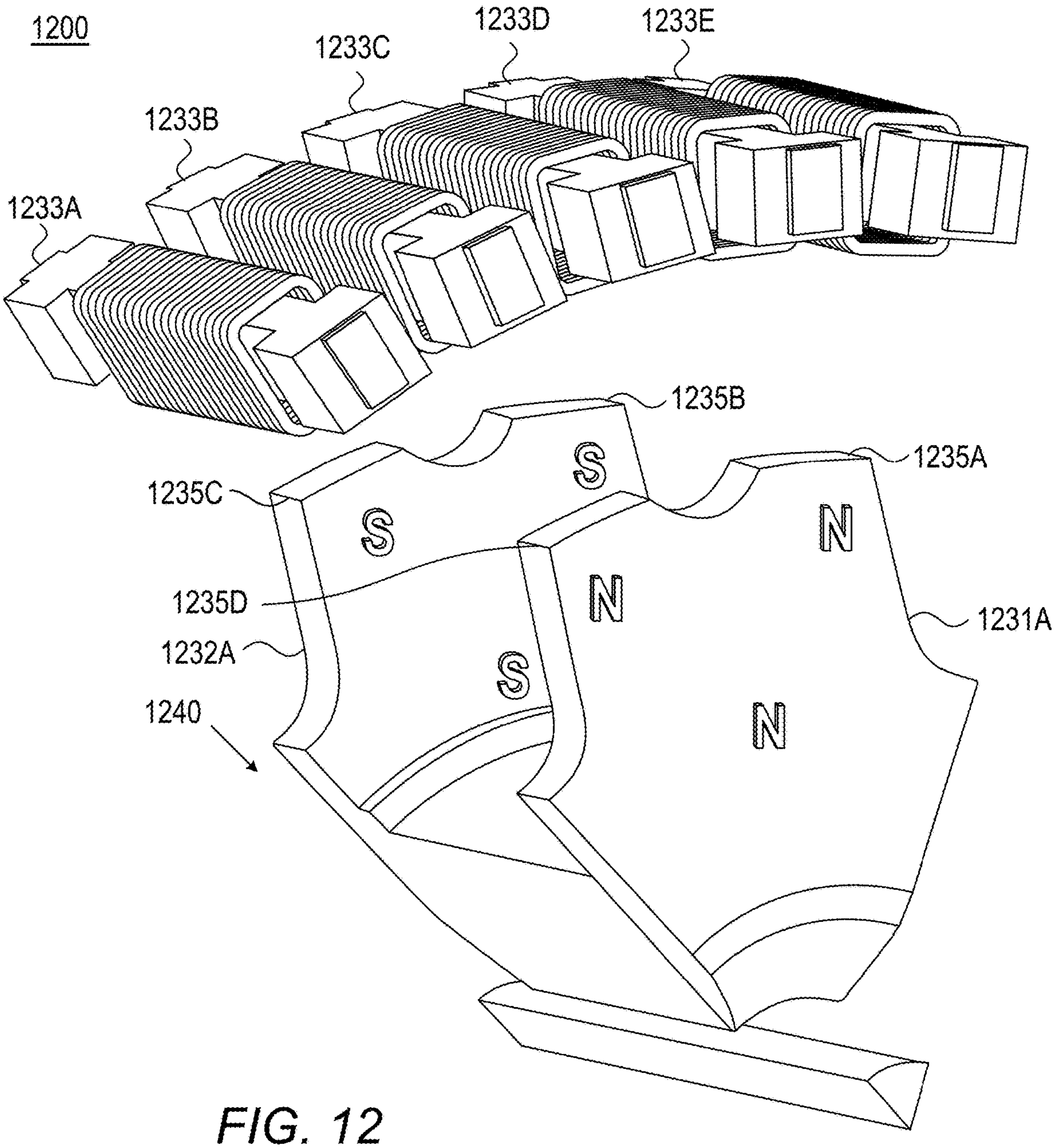
FIG. 12 shows a part of a brushless motor, according to some embodiments of the present invention.

FIG. 12 shows an exploded view of a section of part of a brushless motor 1200, according to some embodiments of the present invention. Stator electromagnets 1233A and 1233B may be located in close proximity to extension pair edges 1235C and 1235D of rotor 1240 and may exert push/pull forces against these edges. Stator electromagnets 1233D and 1233E may be in close proximity to extension pair edges 1235A and 1235B and may provide push/pull forces against these edges. Each electromagnet 1233 of stator 1211 and each first and second section of extension pairs, e.g. edges 1235A-1235D, of a brushless motor 1200 may act independently and can function as a motor without any help from magnetization occurring at adjacent poles.

Figure 13:
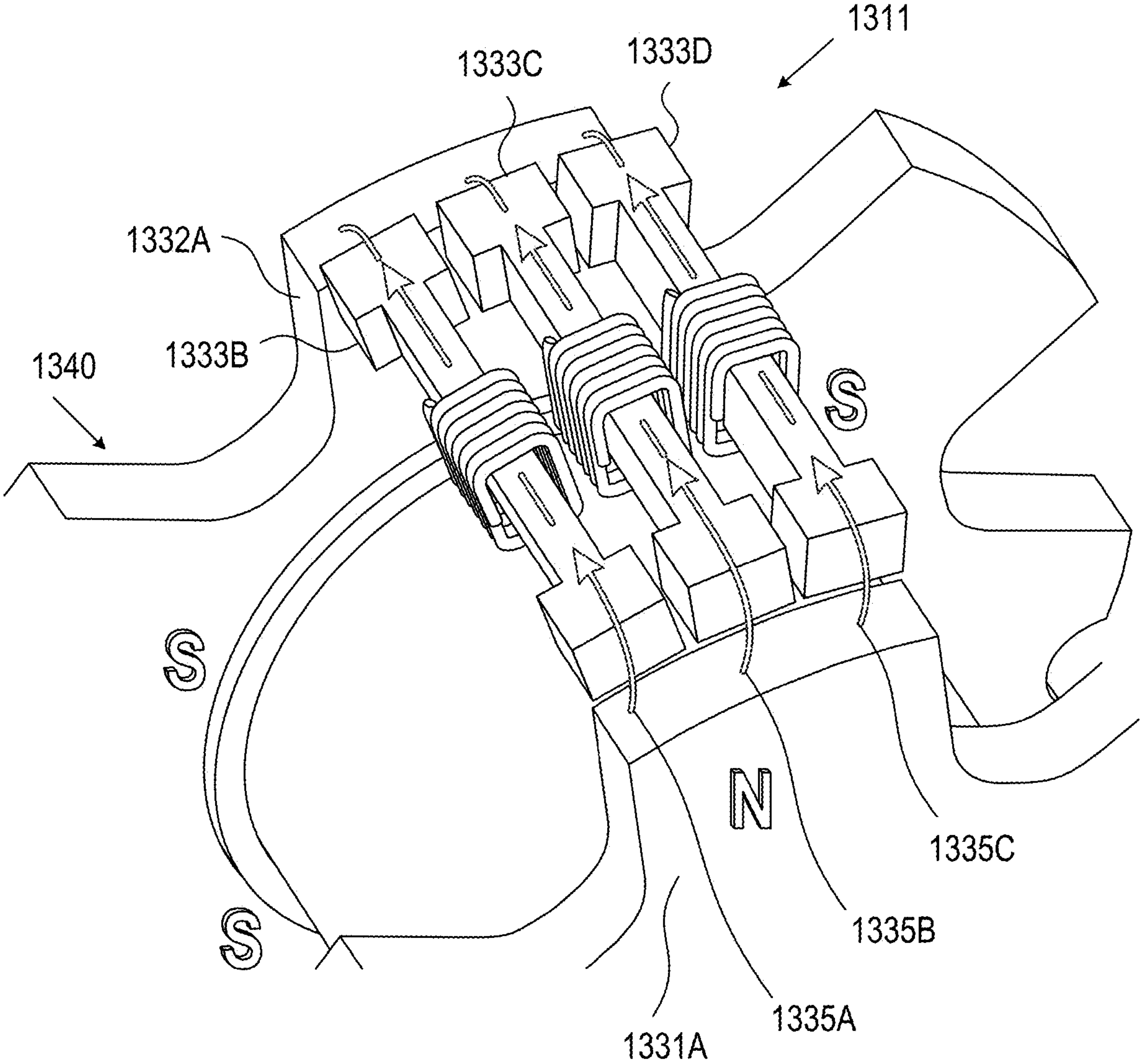
FIG. 13 shows part of a magnetized rotor which includes a plurality of first extensions in form of six poles and wherein the stator includes three non-activated electromagnets, according to some embodiments of the present invention.

FIG. 13 shows part of a magnetized rotor 1340 which includes a plurality of first extensions 1331 in form of six North Poles and a plurality of second extensions 1332 in form of six South Poles (depicted are only two extensions 1331A and 1332A). Stator 1311 may include three non-activated electromagnets 1333B, 1333C and 1333D. Since the electromagnets 1333B, 1333C and 1333D are not activated, a magnetic flux arising from first extensions 1331A may evenly flow through electromagnets cores of 1333B, 1333C and 1333D to second extensions 1332A as indicated by arrows 1335A-1335C.

Figure 14:
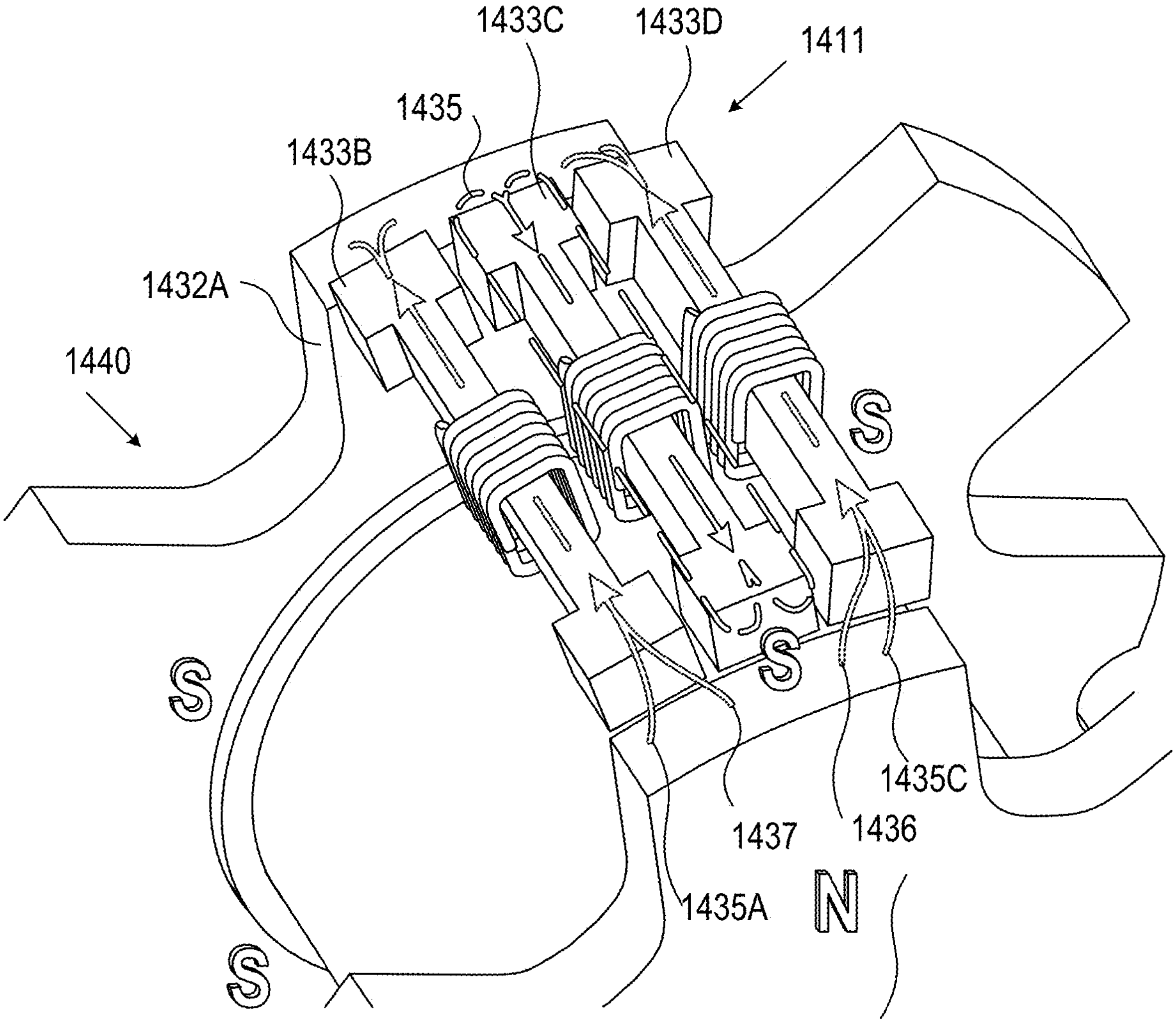
FIG. 14 shows part of a magnetized rotor which includes a plurality of first extensions in form of six poles and wherein the stator includes three electromagnets wherein one electromagnet is activated in opposite polarity to the polarity of the rotor and two non-activated electromagnets, according to some embodiments of the present invention.

FIG. 14 shows part of a magnetized rotor 1440 which includes a plurality of first extensions 1431 in form of six North Poles and a plurality of second extensions 1432 in form of six South Poles (depicted are only two extensions 1431A and 1432A). Stator 1411 may include three electromagnets 1433B-1433D. Electromagnet 1433C may be activated in opposite polarity 1435 to the polarity of rotor 1440, compared to magnetic line 1335B shown in FIG. 13, and electromagnets 1433B-1433D may not be activated. Activation of electromagnet 1433C in opposite direction/polarity to the polarity of rotor 1440 and controlling the polarity 1335B shown in FIG. 13 applied to electromagnet 1433C may split magnetic flux 1335B into magnetic flux 1436 and magnetic flux 1437. Thus, inhibiting a flow of magnetic flux through the core of electromagnet 1433C, may produce a zone between electromagnets 1433B and 1433D which is free of magnetic flux. Thus, as an alternative to an activation of electromagnet 1433C to an opposite polarity with respect to the polarization of the rotor 1440, electromagnet 1433C may be activated with an applied magnetic field that may be sufficient to block magnetic flux 1335B, and may not interfere with the magnetic flux arising from electromagnets 1433B and 1433D and polarized rotor 1440.

Figure 15:
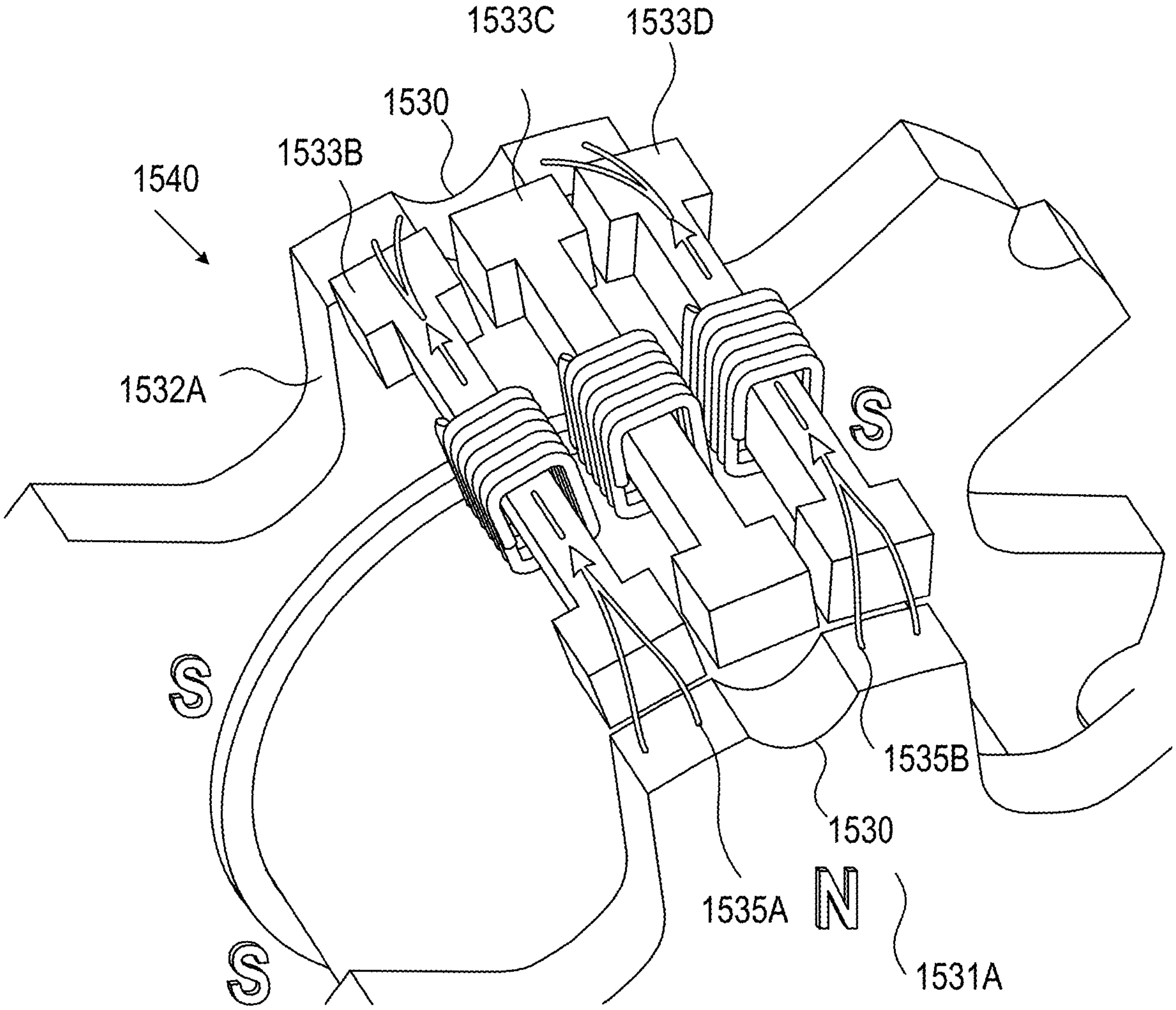
FIG. 15 shows an example method for creating a neutralized zone between electromagnets two electromagnets in close proximity to a plurality of first and second extensions, according to some embodiments of the present invention.

FIG. 15 shows an example method for creating a zone including a neutralized polarization between electromagnets 1533B and 1533D and extension pair 1531A and extension pair 1532A, according to some embodiments. FIG. 15 illustrates an alternative way for neutralization of electromagnet 1533C and creation of a free space between electromagnets 1533B and 1533D. More specifically and with reference to FIG. 12, a zone including a neutralized polarization may be created between two pairs of the electromagnets: 1233A/1233B and 1233D/1233E, which may be free to magnetically function against edges 1235C and 1235D and edges 1235A and 1235B respectively of extension pairs 1231A and 1232A.

Rotor 1540 may include a plurality of first extensions 1531A-1531F in form of six North Poles and a plurality of second extensions 1532A-1532F in form of six South Poles (only extensions 1531A and 1532A shown in FIG. 15). Each extension may be separated into an extension pair by grooves 1530. Thus, first extension 1531A-1531F may include twelve North Poles and second extension 1532A-1532F may include twelve South Poles and each extension pair may be in close proximity, e.g. surrounded by, to five electromagnets 1533.

Grooves, e.g. grooves 1530, may form an air gap between each extension pair, e.g. between the core of electromagnet 1533C and rotor 1540. Since the magnetic flux prefer to flow through ferromagnetic media rather than through air, magnetic lines 1535 may be separated into two parts of magnetic flux 1535A and 1535B. No magnetic flux may be transmitted through the core of electromagnet 1533C leading to a zone of neutral polarization between electromagnets 1533B and 1533D, e.g. when stator electromagnet core 1533C is temporary located above grooves 1530. Thus, a groove may redirect magnetic flux from the rotor to the stator, e.g. by providing a neutral polarization zone.

Figure 16:
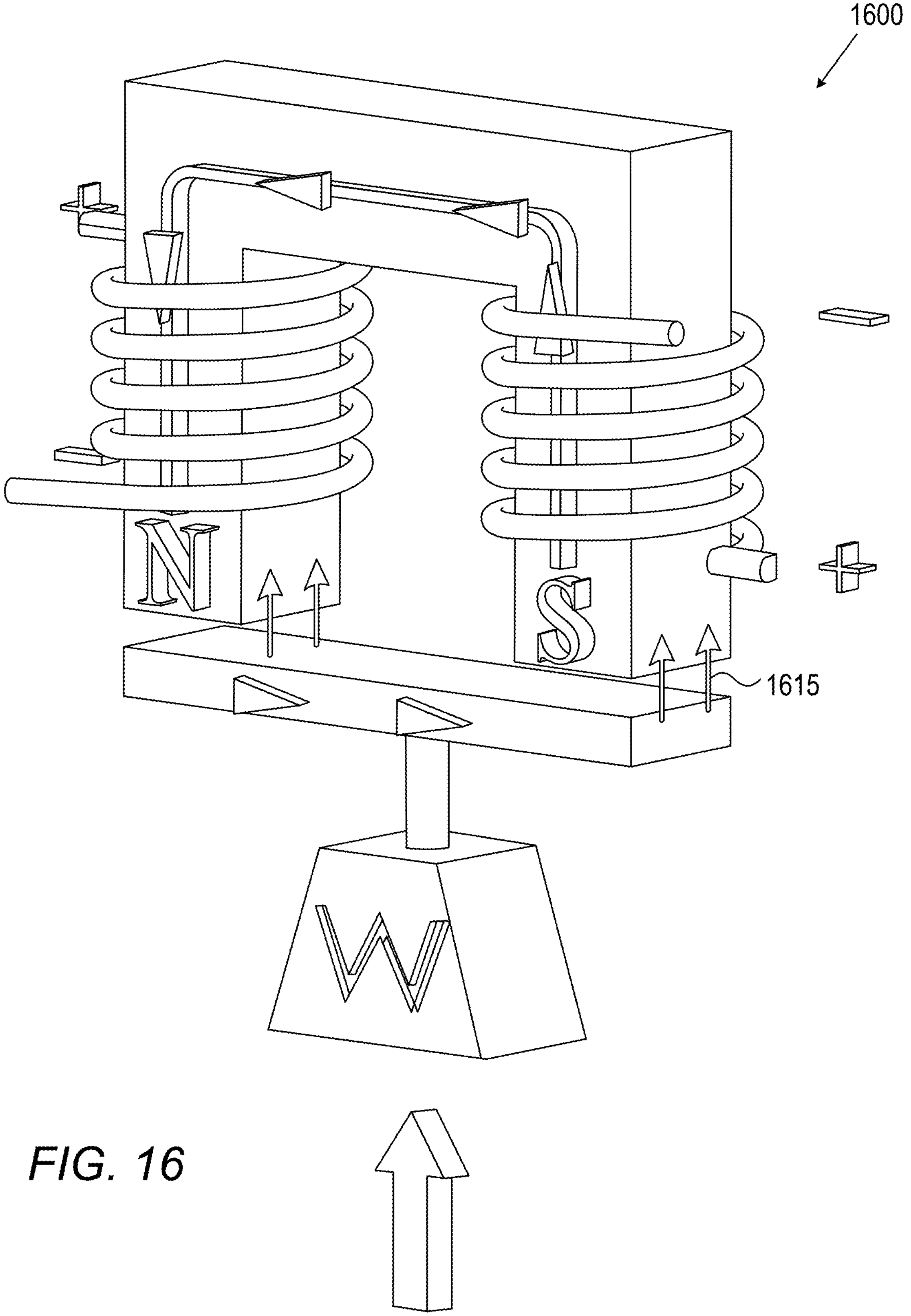
FIG. 16 shows a u-shape electromagnet as known in the prior art.

FIG. 16 shows a u-shaped electromagnet 1600 as known in the prior art. Electromagnet 1600 may be implemented, e.g. to vertically lift and hold heavy loads and transfer between locations, e.g. by generating a vertical force 1615.

Figure 17:
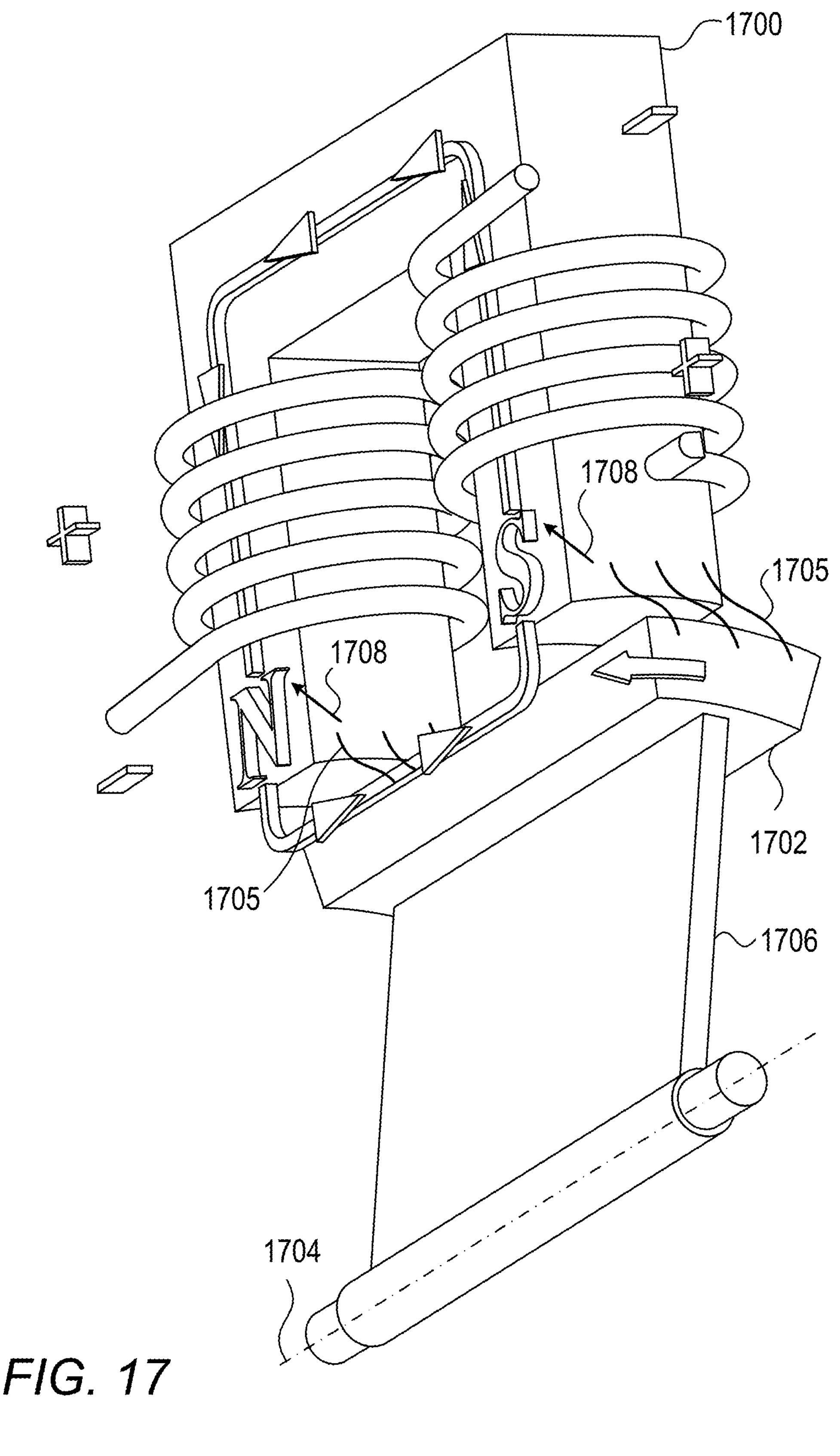
FIG. 17 shows a u-shape electromagnet including a rotor segment which is rotatable along a vertical axis as known in the prior art.

FIG. 17 shows a u-shape electromagnet 1700 including a rotor segment 1702 which is rotatable along an axial axis 1704, as known in the prior art. With reference to FIG. 16, FIG. 17 shows the same prior art u-shape electromagnet 1700, but electromagnet 1700 may pull rotor segment 1702 that may rotate upon axis 1704. As a result of an angle of rotor segment 1706 to the u-shape electromagnet 1700, magnetic lines 1705 may be angled to electromagnet 1700 and may produce rotational vector 1708 that may rotate the rotor segment 1706 along a vertical axis 1704.

The inventive concept is not limited to the arrangement shown in FIG. 17 but may apply to other motor arrangements. For example, a motor may include a plurality electromagnets located on a stator which surrounds an rotor and each stator electromagnet may be similar in its functionality as described in FIG. 17 and a u-shaped electromagnet may pull a rotor pole and may produce a rotational vector that rotates rotor segment 1706 upon axis 1704 as shown in FIG. 17. While a rotor may continuously rotate in specific direction, each stator electromagnet, e.g. magnet 1133 shown in FIG. 11A, can independently change its polarity and produce push or pull force that can rotate or propel a rotor, e.g. rotor 1140.

Figure 18:
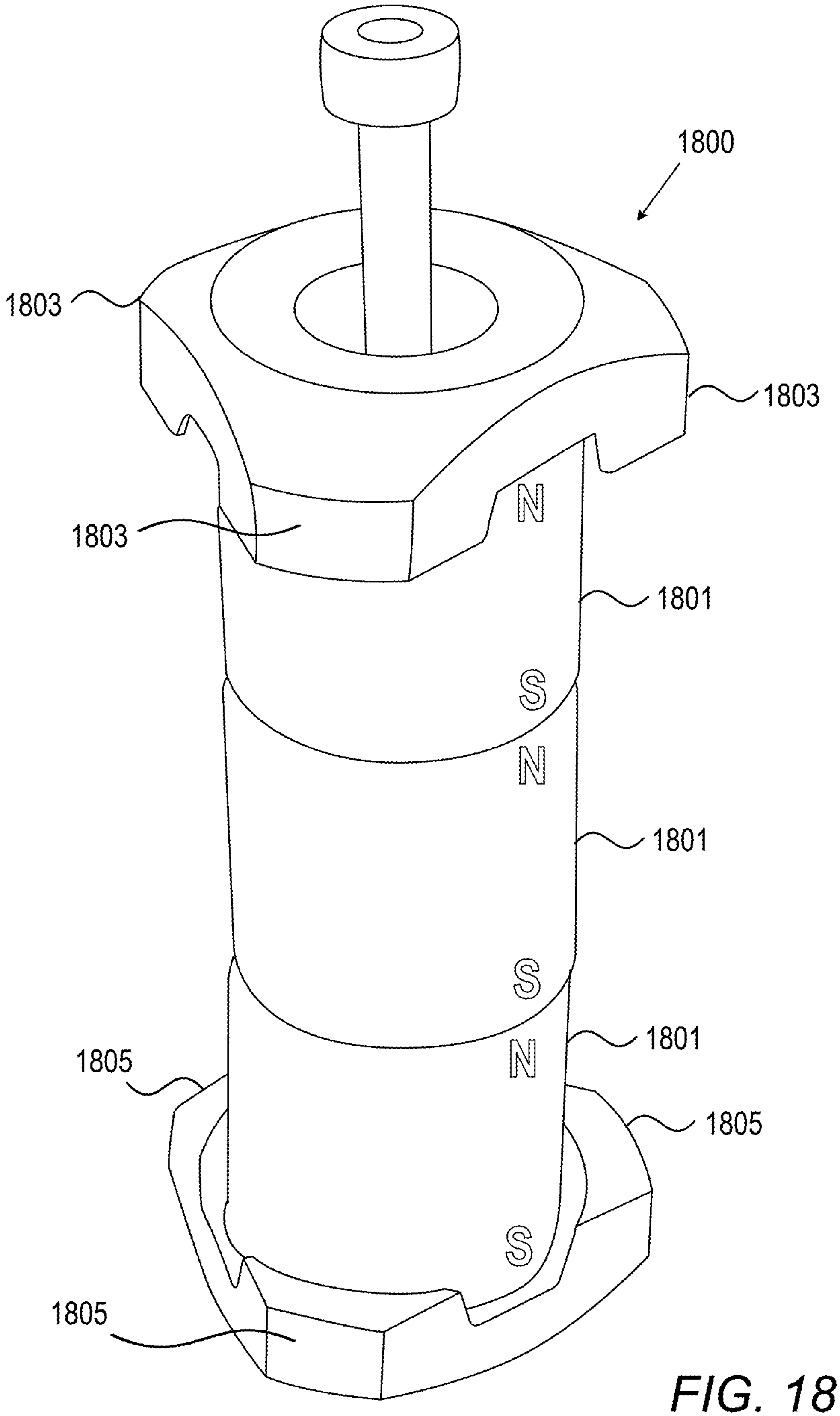
FIG. 18 is an example of a crown brushless motor including a radial crown rotor which is constructed of three axially magnetized, cylindrical permanent magnets, and three radial first extension and three radial second extensions, according to some embodiments of the present invention.

FIG. 18 is an example of a radial crown rotor 1800 which is constructed of three axially magnetized, cylindrical core members 1801, three radial first extensions 1803 and three radial second extensions 1805, according to some embodiments.

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which includes one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment"or "some embodiments"do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A crown brushless motor comprising:
- a stator;
- a rotor comprising:
  - a cylindrical core member;
  - a plurality of first extensions extending from a first end of the cylindrical core member, and
  - a plurality of second extensions extending from a second end of the cylindrical core member; and
- a static coiled wire arranged around the cylindrical core member and configured to magnetize the cylindrical core member to generate a magnetic flux in an axial direction of the cylindrical core member;
- wherein the plurality of first extensions and the plurality of second extensions are configured to split and guide the magnetic flux and change a direction of the magnetic flux from the axial direction to a direction other than the axial direction upon magnetization of the cylindrical core member by the static coiled wire;
- wherein the plurality of first extensions comprises a first member coupled to a first end of the cylindrical core member, the first member comprising a circular first base and the plurality of first extensions extending from the first circular base; and
- wherein the plurality of second extensions comprises a second member coupled to a second end of the cylindrical core member, the second member comprising a circular second base and the plurality of second extensions extending from the second circular base.

2. The crown brushless motor according to claim 1, wherein the plurality of first extensions comprises a number of extensions selected from a group consisting of: 2, 4, 6, 8, 12, 32, 36, and 100.

3. The crown brushless motor according to claim 1, wherein the plurality of second extensions comprises a number of extensions selected from a group consisting 2, 4, 6, 8, 12, 32, 36, and 100.

4. The crown brushless motor according to claim 1, wherein the plurality of first extensions and the plurality of second extensions are u-shaped extensions.

5. The crown brushless motor according to claim 1, wherein the static coiled wire is static relative to the cylindrical core member and configured to magnetically energize the cylindrical core member via induction.

6. The crown brushless motor according to claim 1, wherein the cylindrical core member is freely rotatable within the static coiled wire arranged around the cylindrical core member.

7. The crown brushless motor according to claim 1, wherein the static coiled wire arrangement is mounted on the stator.

8. The crown brushless motor according to claim 1, wherein an output of mechanical energy by the crown brushless motor is controlled by one or more of: shape of the first extensions and the second extensions, magnetic flux direction between the first extensions and the second extensions, stator polarity, electric energy applied to each of the stator electromagnets, distance between the first extensions and electromagnets of the stator, and distance between the second extensions and electromagnets of the stator.

9. The crown brushless motor according to claim 1, wherein the stator comprises a plurality of electromagnets, the electromagnets being arranged radially around the rotational axis of the rotor.

10. A crown brushless motor comprising:
- a stator;
- a rotor comprising:
  - a cylindrical core member;
  - a plurality of first extensions extending from a first end of the cylindrical core member, and
  - a plurality of second extensions extending from a second end of the cylindrical core member; and a static coiled wire arranged around the cylindrical core member and configured to magnetize the cylindrical core member to generate a magnetic flux in an axial direction of the cylindrical core member;

wherein the plurality of first extensions and the plurality of second extensions are configured to split and guide the magnetic flux and change a direction of the magnetic flux from the axial direction to a direction other than the axial direction upon magnetization of the cylindrical core member by the static coiled wire; and wherein the plurality of first extensions and the plurality of second extensions extend outwardly towards a center level of the cylindrical core.

11. A crown brushless motor comprising:

a stator;

a rotor comprising:

a cylindrical core member;

a plurality of first extensions extending from a first end of the cylindrical core member, and a plurality of second extensions extending from a second end of the cylindrical core member; and a static coiled wire arranged around the cylindrical core member and configured to magnetize the cylindrical core member to generate a magnetic flux in an axial direction of the cylindrical core member;

wherein the plurality of first extensions and the plurality of second extensions are configured to split and guide the magnetic flux and change a direction of the magnetic flux from the axial direction to a direction other than the axial direction upon magnetization of the cylindrical core member by the static coiled wire; and wherein the plurality of first extensions and the plurality of second extensions extend inwardly towards a center level of the cylindrical core.

12. A crown brushless motor comprising:

a stator;

a rotor comprising:

a cylindrical core member comprising a permanent magnet, the permanent magnet generates a magnetic flux in an axial direction of cylindrical core member;

a plurality of first extensions extending from a first end of the cylindrical core member, and a plurality of second extensions extending from a second end of the cylindrical core member;

wherein the plurality of first extensions and the plurality of second extensions are configured to split and guide the magnetic flux and change a direction of the magnetic flux from the axial direction to a direction other than the axial direction; and wherein the cylindrical core member, the first extensions and the second extensions form a single permanent magnet.

13. The crown brushless motor according to claim 12, wherein the first extensions and the second extensions are configured to induce a flow of magnetic flux from the first extensions to the second extensions.

14. The crown brushless motor according to claim 12, wherein the stator comprises a plurality of electromagnets and wherein each of the plurality of electromagnets is polarizable to generate a repulsion force between a magnetic field of the one or more electromagnets and a magnetic field of the rotor.

15. A crown brushless motor comprising:

a stator;

a rotor comprising:

a cylindrical core member comprising a permanent magnet, the permanent magnet generates a magnetic flux in an axial direction of cylindrical core member;

a plurality of first extensions extending from a first end of the cylindrical core member, and a plurality of second extensions extending from a second end of the cylindrical core member;

wherein the plurality of first extensions and the plurality of second extensions are configured to split and guide the magnetic flux and change a direction of the magnetic flux from the axial direction to a direction other than the axial direction; and wherein the motor comprises openings in rotor flanges between the rotor and the stator which are configured to ventilate the rotor and stator.

16. A crown brushless motor comprising:

a stator;

a rotor comprising:

a cylindrical core member comprising a permanent magnet, the permanent magnet generates a magnetic flux in an axial direction of cylindrical core member;

a plurality of first extensions extending from a first end of the cylindrical core member, and a plurality of second extensions extending from a second end of the cylindrical core member;

wherein the plurality of first extensions and the plurality of second extensions are configured to split and guide the magnetic flux and change a direction of the magnetic flux from the axial direction to a direction other than the axial direction; and wherein the plurality of first extensions and the plurality of second extensions extend towards a center level of the cylindrical core.

* * * * *